(12) United States Patent
Ji et al.

(10) Patent No.: US 12,169,324 B2
(45) Date of Patent: Dec. 17, 2024

(54) OPTICAL IMAGING LENS GROUP

(71) Applicant: ZHEJIANG SUNNY OPTICS CO., LTD., Zhejiang (CN)

(72) Inventors: Yunbing Ji, Zhejiang (CN); Dawei Tang, Zhejiang (CN); Fujian Dai, Zhejiang (CN); Liefeng Zhao, Zhejiang (CN)

(73) Assignee: ZHEJIANG SUNNY OPTICS CO., LTD., Zhejiang (CN)

( * ) Notice: Subject to any disclaimer, the term of this patent is extended or adjusted under 35 U.S.C. 154(b) by 396 days.

(21) Appl. No.: 17/438,952

(22) PCT Filed: May 22, 2020

(86) PCT No.: PCT/CN2020/091850
§ 371 (c)(1),
(2) Date: Sep. 14, 2021

(87) PCT Pub. No.: WO2021/012770
PCT Pub. Date: Jan. 28, 2021

(65) Prior Publication Data
US 2022/0146787 A1 May 12, 2022

(30) Foreign Application Priority Data
Jul. 22, 2019 (CN) .......................... 201910661727.7

(51) Int. Cl.
*G02B 9/62* (2006.01)
*G02B 13/00* (2006.01)

(52) U.S. Cl.
CPC ........... *G02B 9/62* (2013.01); *G02B 13/0045* (2013.01)

(58) Field of Classification Search
CPC ...... G02B 13/0045; G02B 9/62; G02B 13/06; G02B 13/18; G02B 13/02; G02B 13/00;
(Continued)

(56) References Cited

U.S. PATENT DOCUMENTS

| 4,029,397 A * | 6/1977 | Yamashita ............. G02B 13/04 |
| | | 359/749 |
| 2014/0043695 A1* | 2/2014 | Hsu .................... G02B 13/0045 |
| | | 359/713 |

(Continued)

FOREIGN PATENT DOCUMENTS

| CN | 202067015 U | 12/2011 |
| CN | 202904111 U | 4/2013 |

(Continued)

OTHER PUBLICATIONS

CN priority application first search report issued on Jan. 5, 2024.

*Primary Examiner* — Thomas K Pham
*Assistant Examiner* — Kuei-Jen L Edenfield
(74) *Attorney, Agent, or Firm* — Samson G. Yu

(57) ABSTRACT

The disclosure provides an optical imaging lens group, which sequentially includes, from an object side to an image side along an optical axis: a diaphragm; a first lens with a positive refractive power, an object-side surface thereof being a convex surface; a second lens with a refractive power; a third lens with a negative refractive power; a fourth lens with a refractive power, an object-side surface thereof being a convex surface, while an image-side surface being a concave surface; a fifth lens with a positive refractive power; and a sixth lens with a negative refractive power, an image-side surface thereof being a concave surface; wherein ω is a half of a field of view of the optical imaging lens group, and f5 is an effective focal length of the fifth lens, f5 and ω meet 0.50 mm<f5×(tan ω)$^2$<1.00 mm.

16 Claims, 15 Drawing Sheets

(58) Field of Classification Search
CPC . G02B 27/64; G02B 5/20; G02B 7/04; G02B 3/02
USPC ....... 359/680, 705, 713, 728, 739, 754, 755, 359/756
See application file for complete search history.

(56) References Cited

U.S. PATENT DOCUMENTS

| | | | |
|---|---|---|---|
| 2015/0062406 A1* | 3/2015 | Chen | G02B 13/0045 348/335 |
| 2016/0161709 A1* | 6/2016 | Hsueh | G02B 9/62 359/713 |
| 2016/0170182 A1 | 6/2016 | Tanaka | |
| 2016/0187622 A1* | 6/2016 | Huang | G02B 13/0045 359/713 |
| 2017/0160520 A1* | 6/2017 | Tang | G02B 5/005 |
| 2017/0227736 A1* | 8/2017 | Lai | G02B 9/62 |
| 2020/0409068 A1* | 12/2020 | Oinuma | G02B 13/04 |
| 2020/0409069 A1* | 12/2020 | Xu | G02B 9/62 |

FOREIGN PATENT DOCUMENTS

| | | |
|---|---|---|
| CN | 107976788 A | 5/2018 |
| CN | 108535844 A | 9/2018 |
| CN | 109283664 A | 1/2019 |
| CN | 109709659 A | 5/2019 |
| CN | 110376717 A | 10/2019 |
| CN | 210155386 U | 3/2020 |
| JP | 2014202766 A | 10/2014 |

* cited by examiner

Longitudinal aberration curve

Longitudinal aberration curve

OPTICAL IMAGING LENS GROUP

CROSS-REFERENCE TO RELATED APPLICATION(S)

The disclosure claims priority to Chinese Patent Application No. 201910661727.7, filed on Jul. 22, 2019 and entitled "Optical imaging lens group", the contents of which are hereby incorporated by reference in its entirety.

TECHNICAL FIELD

The disclosure relates to an optical imaging lens group, and more particularly to an optical imaging lens group including six lenses.

BACKGROUND

With the constant development of sciences and technologies, optical imaging lens group has played a more and more important role in people's work and life. Telephoto imaging lens group takes an important place in numerous imaging lens groups due to its advantage of long-distance shooting.

An ordinary short-focus imaging lens group may achieve a high imaging resolution when shooting a scenery at a short distance, but may not clearly image a scenery on a detector during long-distance shooting. If a picture to be shot is enlarged to make the scenery clear, the picture may have many noisy points and seem smudged. Compared with a short-focus imaging lens group, a telephoto imaging lens group may implement long-distance high-resolution imaging due to its telephoto characteristic, and may still keep a picture clear when an object is enlarged once. Therefore, it is necessary to use an optical imaging lens group with a greater focal length to achieve a higher imaging resolution during long-distance shooting.

SUMMARY

The disclosure provides an optical imaging lens group applicable to a portable electronic product and capable of at least overcoming or partially overcoming at least one shortcoming in a related art.

An embodiment of the disclosure provides an optical imaging lens group, which sequentially includes, from an object side to an image side along an optical axis: a diaphragm; a first lens with a positive refractive power, an object-side surface thereof being a convex surface; a second lens with a refractive power; a third lens with a negative refractive power; a fourth lens with a refractive power, an object-side surface thereof being a convex surface, while an image-side surface thereof being a concave surface; a fifth lens with a refractive power; and a sixth lens with a negative refractive power, an image-side surface thereof being a concave surface.

In an implementation mode, the fifth lens may have positive refractive power, $\omega$ is a half of a field of view of the optical imaging lens group, and f5 is an effective focal length of the fifth lens, f5 and $\omega$ may meet $0.50$ mm$<$f5$\times$(tan $\omega)^2<1.00$ mm.

In an implementation mode, TTL is a distance from the object-side surface of the first lens to an imaging surface of the optical imaging lens group on the optical axis, ImgH is a half of a diagonal length of an effective pixel region on the imaging surface of the optical imaging lens group, and f is, a total effective focal length of the optical imaging lens group, TTL, f and ImgH may meet ImgH/f$\times$TTL$>3.50$ mm.

In an implementation mode, R9 is a curvature radius of an object-side surface of the fifth lens and R10 is a curvature radius of an image-side surface of the fifth lens, R9 and R10 may meet $3.00<$(R9+R10)/(R9$-$R10)$<5.00$.

In an implementation mode, R1 is a curvature radius of the object-side surface of the first lens and R6 is a curvature radius of an image-side surface of the third lens, R1 and R6 may meet $1.00<$R6/R1$<2.00$.

In an implementation mode, SAG51 is an on-axis distance from an intersection point of an object-side surface of the fifth lens and the optical axis to an effective radius vertex of the object-side surface of the fifth lens, SAG52 is an on-axis distance from an intersection point of an image-side surface of the fifth lens and the optical axis to an effective radius vertex of the image-side surface of the fifth lens, SAG51 and SAG52 may meet $1.40<$SAG52/SAG51$<2.00$.

In the exemplary implementation mode, f is a total effective focal length of the optical imaging lens group, f1 is an effective focal length of the first lens and f2 is an effective focal length of the second lens, f, f1 and f2 may meet $1.50<$(f1+f2)/f$<4.00$.

In an implementation mode, T34 is a spacing distance of the third lens and the fourth lens on the optical axis and CT3 is a center thickness of the third lens on the optical axis, T34 and CT3 may meet $0.50<$CT3/T34$<1.50$.

In an implementation mode, f1 is an effective focal length of the first lens, f2 is an effective focal length of the second lens and R1 is a curvature radius of the object-side surface of the first lens, f1, f2 and R1 may meet $15.00$ mm$<$f2/f1$\times$R1$<40.00$ mm.

In an implementation mode, TD is a distance from the object-side surface of the first lens to the image-side surface of the sixth lens on the optical axis and $\Sigma$CT is a sum of center thicknesses of the first lens to the sixth lens on the optical axis respectively, TD and $\Sigma$CT may meet $1.50<$TD/$\Sigma$CT$<2.50$.

In an implementation mode, DT11 is a maximum effective radius of the object-side surface of the first lens and DT12 is a maximum effective radius of an image-side surface of the first lens, DT11 and DT12 may meet $30.00<$(DT11+DT12)/(DT11$-$DT12)$<50.50$.

In an implementation mode, f is a total effective focal length of the optical imaging lens group, f may meet f$>23.50$ mm.

According to the disclosure, six aspheric lenses are adopted, and the refractive power and surface types of each lens, the center thickness of each lens, on-axis distances between the lenses, and the like are reasonably configured to achieve at least one beneficial effect of ultra-thin design, great focal length, high imaging quality, and the like of the optical imaging lens group.

BRIEF DESCRIPTION OF THE DRAWINGS

Detailed descriptions made to unrestrictive implementation modes with reference to the following drawings are read to make the other characteristics, purposes and advantages of the disclosure more apparent.

DETAILED DESCRIPTION OF THE EMBODIMENTS

Figure 1:
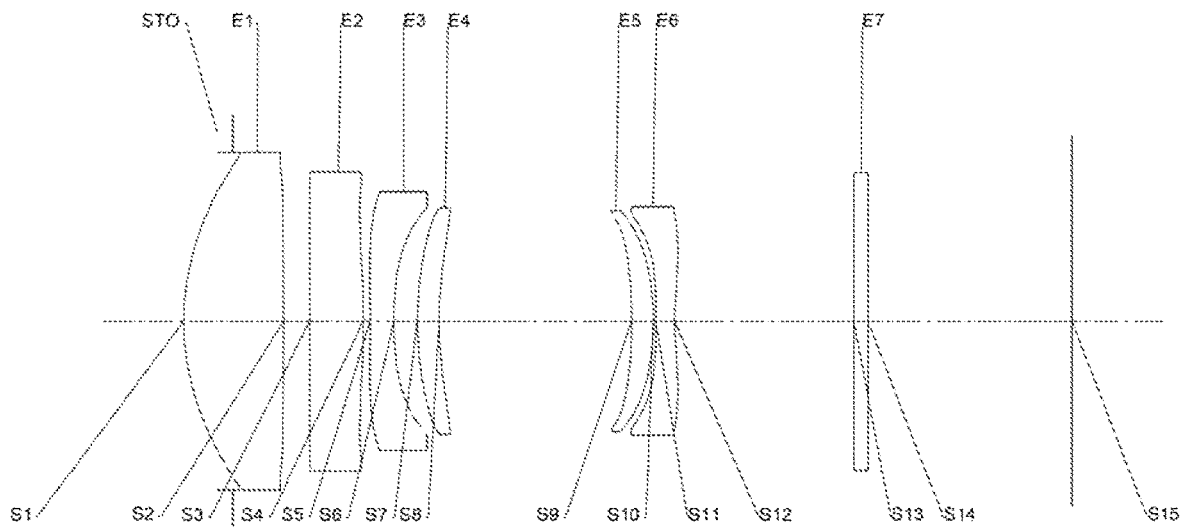
FIG. 1 shows a structure diagram of an optical imaging lens group according to embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, and the like are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain", and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It is also to be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles, and other aspects of the disclosure will be described below in detail.

An optical imaging lens group according to an exemplary implementation mode of the disclosure may include a diaphragm and six lenses with a refractive power, i.e., a first lens, a second lens, a third lens, a fourth lens, a fifth lens, and a sixth lens respectively. The six lenses are sequentially arranged from an object side to an image side along an optical axis. In the first lens to the sixth lens, there may be a spacing distance between any two adjacent lenses.

In the exemplary implementation mode, the first lens may have positive refractive power, and an object-side surface thereof is a convex surface; the second lens may have refractive power; the third lens may have negative refractive power; the fourth lens may have refractive power, an object-side surface thereof is a convex surface, while an image-side surface thereof is a concave surface; the fifth lens may have refractive power; and the sixth lens may have negative refractive power, and an image-side surface thereof is a concave surface.

In the exemplary implementation mode, the optical imaging lens group according to the disclosure may meet 0.50 mm<f5×(tan ω)$^2$<1.00 mm, wherein f5 is an effective focal length of the fifth lens, and ω is a half of a field of view of the optical imaging lens group. More specifically, ω may further meet 0.55 mm<f5×(tan ω)$^2$<0.85 mm. Meeting 0.50 mm<f5×(tan ω)$^2$<1.00 mm may control the field of view in a certain range to alleviate the deflection of an incident ray by the first lens, prevent the excessive increase of an aberration, and help to improve the image quality. Optionally, the fifth lens may have positive refractive power. The refractive power of the fifth lens is configured reasonably to prevent the excessive refraction of the ray and facilitate the correction of a field curvature of the optical imaging lens group and, meanwhile, correct a distortion of the optical imaging lens group.

In the exemplary implementation mode, the optical imaging lens group according to the disclosure may meet ImgH/ f×TTL>3.50 mm, wherein TTL is a distance from the object-side surface of the first lens to an imaging surface of the optical imaging lens group on the optical axis, f is a total effective focal length of the optical imaging lens group, and ImgH is a half of a diagonal length of an effective pixel region on the imaging surface of the optical imaging lens group. More specifically, TTL, f and ImgH may further meet ImgHf/×TTL>3.58 mm. Meeting ImgHf/×TTL>3.50 mm may control the total track length of the lens group in a certain range under the condition of ensuring a great focal length of the lens group to help to ensure the compactness of the optical imaging lens group, prevent the excessive increase of the aberration and improve the imaging quality.

In the exemplary implementation mode, the optical imaging lens group according to the disclosure may meet 3.00<(R9+R10)/(R9−R10)<5.00, wherein R9 is a curvature radius of an object-side surface of the fifth lens, and R10 is a curvature radius of an image-side surface of the fifth lens. More specifically, R9 and R10 may further meet 3.10<(R9+R10)/(R9−R10)<4.90. Meeting 3.00<(R9+R10)/(R9−R10)<5.00 is favorable for balancing the aberration of the optical imaging lens group better.

In the exemplary implementation mode, the optical imaging lens group according to the disclosure may meet 1.00<R6/R1<2.00, wherein R1 is a curvature radius of the object-side surface of the first lens, and R6 is a curvature radius of an image-side surface of the third lens. More specifically, R1 and R6 may further meet 1.05<R6/R1<1.80. Meeting 1.00<R6/R1<2.00 may effectively prevent the incident ray from being excessively refracted by the first lens and the third lens and help to balance the aberration of the optical imaging lens group.

In the exemplary implementation mode, the optical imaging lens group according to the disclosure may meet 1.40<SAG52/SAG51<2.00, wherein SAG51 is an on-axis distance from an intersection point of an object-side surface of the fifth lens and the optical axis to an effective radius vertex of the object-side surface of the fifth lens, and SAG52 is an on-axis distance from an intersection point of an image-side surface of the fifth lens and the optical axis to an effective radius vertex of the image-side surface of the fifth lens. More specifically, SAG51 and SAG52 may further meet 1.45<SAG52/SAG51<1.80. Meeting 1.40<SAG52/SAG51<2.00 may effectively avoid fifth lens being excessively bent to reduce difficulties in machining and, meanwhile, balance the color and distortion of the optical imaging lens group relatively well.

In the exemplary implementation mode, the optical imaging lens group according to the disclosure may meet 1.50<(f1+f2)/f<4.00, wherein f is a total effective focal length of the optical imaging lens group, f1 is an effective focal length of the first lens, and f2 is an effective focal length of the second lens. More specifically, f, f1 and f2 may further meet 1.75<(f1+f2)/f<3.80. Meeting 1.50<(f1+f2)/f<4.00 may effectively prevent an excessively great effective focal length of the first lens and an excessively great effective focal length of the second lens, reduce the sensitivity of the first lens and second lens of the optical imaging lens group and, meanwhile, help to balance the aberration of the optical imaging lens group better.

In the exemplary implementation mode, the optical imaging lens group according to the disclosure may meet 0.50<CT3/T34<1.50, wherein T34 is a spacing distance of the third lens and the fourth lens on the optical axis, and CT3 is a center thickness of the third lens on the optical axis. More specifically, T34 and CT3 may further meet 0.55<CT3/T34<1.30. Meeting 0.50<CT3/T34<1.50 may not only effectively reduce the size of the optical imaging lens group to avoid an excessively large size of the optical imaging lens group but also reduce difficulties in the assembling of the optical imaging lens group to achieve a relatively high space utilization rate of the optical imaging lens group.

In the exemplary implementation mode, the optical imaging lens group according to the disclosure may meet 15.00 mm<f2/f1×R1<40.00 mm, wherein f1 is an effective focal length of the first lens, f2 is an effective focal length of the second lens, and R1 is a curvature radius of the object-side surface of the first lens. More specifically, f1, f2 and R1 may further meet 15.30 mm<f2/f1×R1<38.00 mm. Meeting 15.00 mm<f2/f1×R1<40.00 mm may not only prevent the incident ray from being excessively refracted after passing through the optical imaging lens group to facilitate the correction of the field curvature of the optical imaging lens group but also correct the distortion of the optical imaging lens group.

In the exemplary implementation mode, the optical imaging lens group according to the disclosure may meet 1.50<TD/ΣCT<2.50, wherein TD is a distance from the object-side surface of the first lens to the image-side surface of the sixth lens on the optical axis, and ΣCT is a sum of center thicknesses of the first lens to the sixth lens on the optical axis respectively. More specifically, TD and ΣCT may further meet 1.70<TD/ΣCT<2.30. Meeting 1.50<TD/ΣCT<2.50 may ensure the machining and assembling characteristics of the lens of the optical imaging lens group, help to alleviate the deflection of the incident ray, adjust the field curvature of the optical imaging lens group, reduce the sensitivity of the optical imaging lens group, and further achieve higher imaging quality of the optical imaging lens group.

In the exemplary implementation mode, the optical imaging lens group according to the disclosure may meet 30.00<(DT11+DT12)/(DT11−DT12)<50.50, wherein DT11 is a maximum effective radius of the object-side surface of the first lens, and DT12 is a maximum effective radius of an image-side surface of the first lens. More specifically, DT11 and DT12 may further meet 31.00<(DT11+DT12)/(DT11−DT12)<50.40. Meeting 30.00<(DT11+DT12)/(DT11−DT12)<50.50 may effectively prevent an excessively great difference of effective radii of the object-side surface and image-side surface of the first lens and facilitate the machining and forming of the lens of the optical imaging lens group and the improvement of the performance stability of the optical imaging lens group.

In the exemplary implementation mode, the optical imaging lens group according to the disclosure may meet f>23.50 mm, wherein f is a total effective focal length of the optical imaging lens group. More specifically, f may further meet f>23.60 mm. Meeting f>23.50 mm may ensure relatively high resolving power of the optical imaging lens even during long-distance shooting and, meanwhile, help to realize a higher-ratio zoom function of the optical imaging lens group.

Optionally, the optical imaging lens group may further include an optical filter configured to correct the color and/or protective glass configured to protect a photosensitive element on the imaging surface.

The disclosure discloses an optical imaging lens group with a great focal length and six aspheric lenses. The optical imaging lens group according to the implementation mode of the disclosure may adopt multiple lenses, for example, the abovementioned six. The refractive power and surface types of each lens, the center thickness of each lens, on-axis distances between the lenses and the like are reasonably configured to effectively reduce the size of the imaging lens group, reduce the sensitivity of the imaging lens group, improve the machinability of the imaging lens group and ensure that the optical imaging lens group is more favorable for production and machining.

In the implementation mode of the disclosure, at least one of mirror surfaces of each lens is an aspheric mirror surface, namely at least one mirror surface in the object-side surface of the first lens to the image-side surface of the sixth lens is an aspheric mirror surface. An aspheric lens has a characteristic that a curvature keeps changing from a center of the lens to a periphery of the lens. Unlike a spherical lens with a constant curvature from a center of the lens to a periphery of the lens, the aspheric lens has a better curvature radius characteristic and the advantages of improving distortions and improving astigmatic aberrations. With the adoption of the aspheric lens, astigmatic aberrations during imaging may be eliminated as much as possible, thereby improving the imaging quality. Optionally, at least one of the object-side surface and image-side surface of each lens in the first lens, the second lens, the third lens, the fourth lens, the fifth lens and the sixth lens is an aspheric mirror surface. Optionally, both the object-side surface and image-side surface of each lens in the first lens, the second lens, the third lens, the fourth lens, the fifth lens and the sixth lens are aspheric mirror surfaces.

However, those skilled in the art should know that the number of the lenses forming the optical imaging lens group may be changed without departing from the technical solutions claimed in the disclosure to achieve each result and advantage described in the specification. For example, although descriptions are made in the implementation with six lenses as an example, the optical imaging lens group is not limited to six lenses. If necessary, the optical imaging lens group may further include another number of lenses.

Specific embodiments applied to the optical imaging lens group of the abovementioned implementation mode will further be described below with reference to the drawings.

Embodiment 1

An optical imaging lens group according to embodiment 1 of the disclosure will be described below with reference to FIG. 1 to FIG. 2D. FIG. 1 is a structure diagram of an optical imaging lens group according to embodiment 1 of the disclosure.

As shown in FIG. 1, the optical imaging lens group sequentially includes, from an object side to an image side, a diaphragm STO, a first lens E1, a second lens E2, a third lens E3, a fourth lens E4, a fifth lens E5, a sixth lens E6, an optical filter E7, and an imaging surface S15.

The first lens E1 has a positive refractive power, an object-side surface S1 thereof is a convex surface, while an image-side surface S2 is a convex surface. The second lens E2 has a positive refractive power, an object-side surface S3 thereof is a concave surface, while an image-side surface S4 is a convex surface. The third lens E3 has a negative refractive power, an object-side surface S5 thereof is a concave surface, while an image-side surface S6 is a concave surface. The fourth lens E4 has a positive refractive power, an object-side surface S7 thereof is a convex surface, while an image-side surface S8 is a concave surface. The fifth lens E5 has a positive refractive power, an object-side surface S9 thereof is a concave surface, while an image-side surface S10 is a convex surface. The sixth lens E6 has a negative refractive power, an object-side surface S11 thereof is a convex surface, while an image-side surface S12 is a concave surface. An optical filter E7 has an object-side surface S13 and an image-side surface S14. Light from an object sequentially penetrates through each of the surfaces S1 to S14 and is finally imaged on the imaging surface S15.

Table 1 shows a basic parameter table of the optical imaging lens group of embodiment 1, and units of the curvature radius, the thickness/distance and the focal length are all millimeter (mm).

TABLE 1

| Surface number | Surface type | Curvature radius | Thickness/ distance | Refractive index | Abbe number | Focal length | Conic coefficient |
|---|---|---|---|---|---|---|---|
| OBJ | Spherical | Infinite | Infinite | | | | |
| STO | Spherical | Infinite | −1.1201 | | | | |
| S1 | Aspheric | 6.0040 | 2.2768 | 1.55 | 56.1 | 10.70 | −0.0597 |
| S2 | Aspheric | −194.6324 | 0.6083 | | | | −99.0000 |
| S3 | Aspheric | −400.0000 | 1.2272 | 1.55 | 56.1 | 41.80 | −99.0000 |
| S4 | Aspheric | −21.6336 | 0.1554 | | | | −32.1412 |
| S5 | Aspheric | −26.7609 | 0.5355 | 1.62 | 23.5 | −10.95 | 21.6125 |
| S6 | Aspheric | 9.6970 | 0.5413 | | | | 2.5454 |
| S7 | Aspheric | 7.9087 | 0.4910 | 1.55 | 56.1 | 259.30 | −0.0621 |
| S8 | Aspheric | 8.1924 | 4.4102 | | | | −2.6522 |
| S9 | Aspheric | −12.4037 | 0.4935 | 1.67 | 20.4 | 19.09 | −4.0251 |
| S10 | Aspheric | −6.3885 | 0.0500 | | | | −0.6958 |
| S11 | Aspheric | 78.0234 | 0.4337 | 1.55 | 56.1 | −12.69 | −99.0000 |
| S12 | Aspheric | 6.3581 | 4.0888 | | | | 1.9213 |
| S13 | Spherical | Infinite | 0.3300 | 1.51 | 64.2 | | |
| S14 | Spherical | Infinite | 4.6583 | | | | |
| S15 | Spherical | Infinite | | | | | |

In the example, f is a total effective focal length of the optical imaging lens group, f meet 24.00 mm, a Total Track Length (TTL) of the optical imaging lens group (i.e., a distance from the object-side surface S1 of the first lens E1 to the imaging surface S15 of the optical imaging lens group on an optical axis) is 20.30 mm, ImgH is a half of a diagonal length of an effective pixel region on the imaging surface S15 of the optical imaging lens group, ImgH is 4.30 mm, ω is a half of a maximum field of view of the optical imaging lens group, ω is 9.9°, Fno is an F-number, and Fno is 3.06.

In embodiment 1, both the object-side surface and image-side surface of any lens in the first lens E1 to the sixth lens E6 are aspheric surfaces, and a surface type x of each aspheric lens may be defined through, but not limited to, the following aspheric surface formula:

$$x = \frac{ch^2}{1+\sqrt{1-(k+1)c^2h^2}} + \sum A_i h^i, \quad (1)$$

wherein x is a distance vector height from a vertex of the aspheric surface when the aspheric surface is at a height of h along the optical axis direction; c is a paraxial curvature of the aspheric surface, c=1/R (namely, the paraxial curvature c is a reciprocal of the curvature radius R in Table 1); k is a conic coefficient; and Ai is a correction coefficient of the i-th order of the aspheric surface. Table 2 shows high-order coefficients A4, A6, A8, A10, A12, A14, A16, A18 and A20 applied to the aspheric mirror surfaces S1-S12 in embodiment 1.

Figure 3:
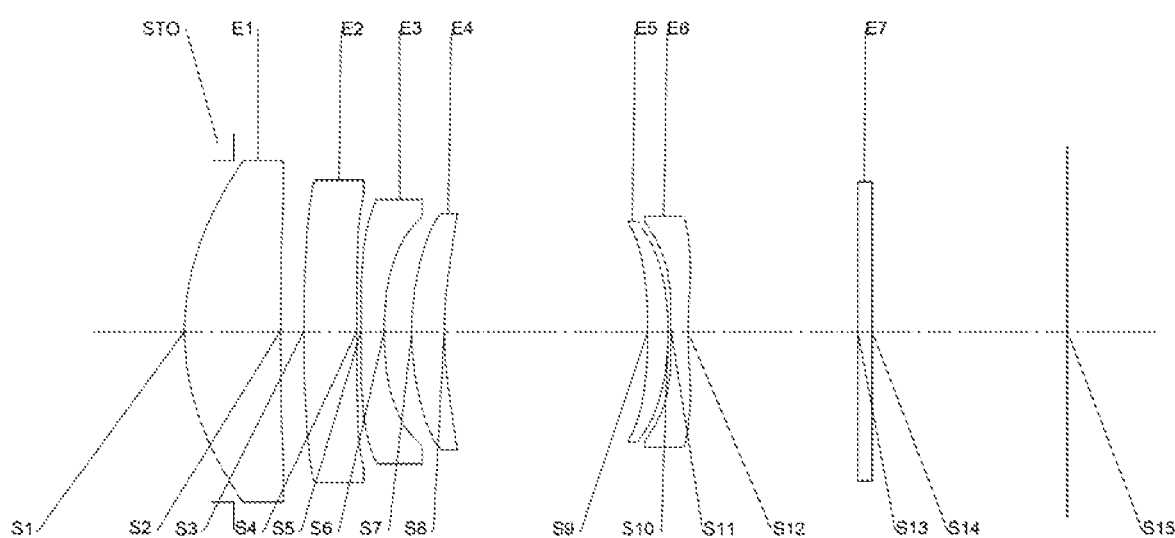
FIG. 3 shows a structure diagram of an optical imaging lens group according to embodiment 2 of the disclosure.

As shown in FIG. 3, the optical imaging lens group sequentially includes, from an object side to an image side, a diaphragm STO, a first lens E1, a second lens E2, a third lens E3, a fourth lens E4, a fifth lens E5, a sixth lens E6, an optical filter E7, and an imaging surface S15.

The first lens E1 has a positive refractive power, an object-side surface S1 thereof is a convex surface, while an image-side surface S2 is a concave surface. The second lens E2 has a positive refractive power, an object-side surface S3 thereof is a convex surface, while an image-side surface S4 is a concave surface. The third lens E3 has a negative refractive power, an object-side surface S5 thereof is a concave surface, while an image-side surface S6 is a concave surface. The fourth lens E4 has a positive refractive power, an object-side surface S7 thereof is a convex surface,

TABLE 2

| Surface number | A4 | A6 | A8 | A10 | A12 | A14 | A16 | A18 | A20 |
|---|---|---|---|---|---|---|---|---|---|
| S1 | −2.6181E−04 | 2.3270E−05 | −9.5760E−06 | 1.8158E−06 | −2.6801E−07 | 2.5473E−08 | −1.4419E−09 | 4.2908E−11 | −5.0704E−13 |
| S2 | −2.1747E−04 | 1.8603E−04 | −6.8565E−05 | 1.3070E−05 | −1.5872E−06 | 1.2919E−07 | −7.0115E−09 | 2.2965E−10 | −3.3689E−12 |
| S3 | 5.3651E−06 | 9.3639E−05 | −5.7226E−05 | 1.7652E−05 | −2.9155E−06 | 2.9639E−07 | −2.0019E−08 | 8.5702E−10 | −1.7085E−11 |
| S4 | −3.4914E−03 | 4.6184E−03 | −2.3494E−03 | 7.1102E−04 | −1.3478E−04 | 1.6291E−05 | −1.2282E−06 | 5.3062E−08 | −1.0093E−09 |
| S5 | 8.8358E−04 | 8.4720E−03 | −4.9758E−03 | 1.5490E−03 | −2.9774E−04 | 3.6553E−05 | −2.8013E−06 | 1.2283E−07 | −2.3706E−09 |
| S6 | 3.5033E−03 | 7.1099E−03 | −3.5489E−03 | 7.2160E−04 | −1.7011E−05 | −2.0456E−05 | 4.0550E−06 | −3.2302E−07 | 9.5740E−09 |
| S7 | −7.3254E−03 | 4.2868E−03 | −5.4165E−04 | −5.7684E−04 | 3.4241E−04 | −8.7800E−05 | 1.2255E−05 | −9.0671E−07 | 2.7985E−08 |
| S8 | −7.2942E−03 | 1.8661E−03 | 1.3780E−04 | −5.3411E−04 | 2.6916E−04 | −6.8983E−05 | 9.9812E−06 | −7.7688E−07 | 2.5435E−08 |
| S9 | 1.2966E−03 | −4.2228E−03 | 3.4433E−03 | −1.8031E−03 | 5.3003E−04 | −8.3508E−05 | 5.8119E−06 | 8.6696E−09 | −1.5269E−08 |
| S10 | −1.6380E−03 | −2.2619E−03 | 4.6565E−03 | −3.9288E−03 | 1.6050E−03 | −3.6321E−04 | 4.6630E−05 | −3.1806E−06 | 8.9270E−08 |
| S11 | −3.5938E−02 | 1.0149E−02 | 8.1562E−04 | −3.5777E−03 | 1.9056E−03 | −5.0034E−04 | 7.2529E−05 | −5.5596E−06 | 1.7651E−07 |
| S12 | −3.4786E−02 | 1.1022E−02 | −3.8861E−03 | 1.0060E−03 | −1.5740E−04 | 1.1049E−05 | 3.2488E−07 | −1.0041E−07 | 4.4962E−09 |

Figure 2A:
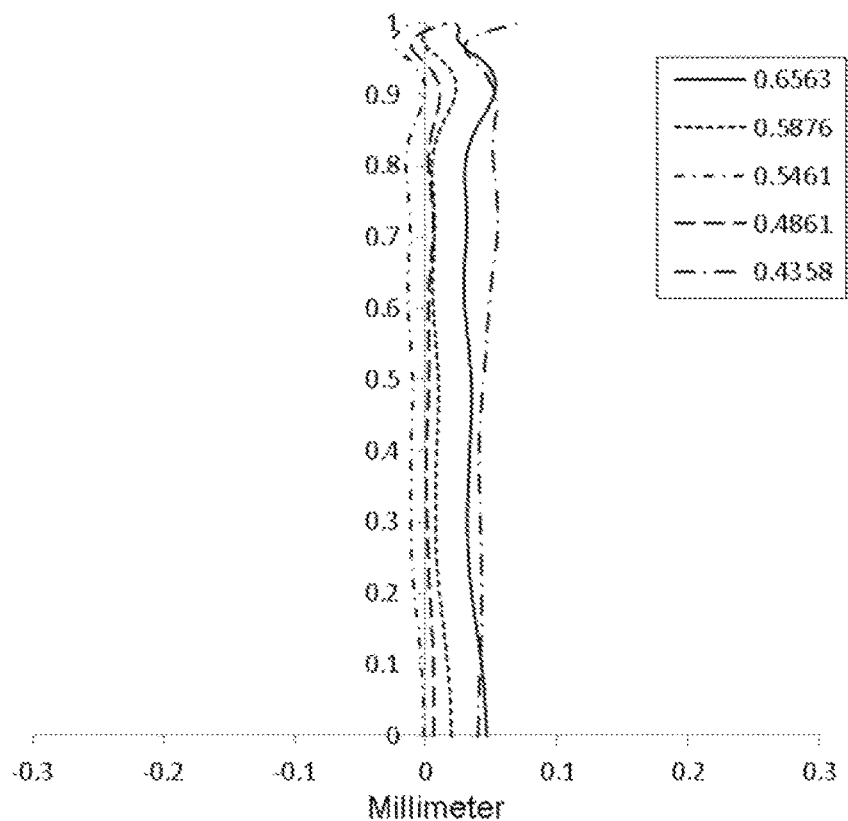
FIG. 2A to FIG. 2D show a longitudinal aberration curve, an astigmatism curve, a distortion curve, and a lateral color curve of an optical imaging lens group according to embodiment 1 respectively.
Figure 2B:
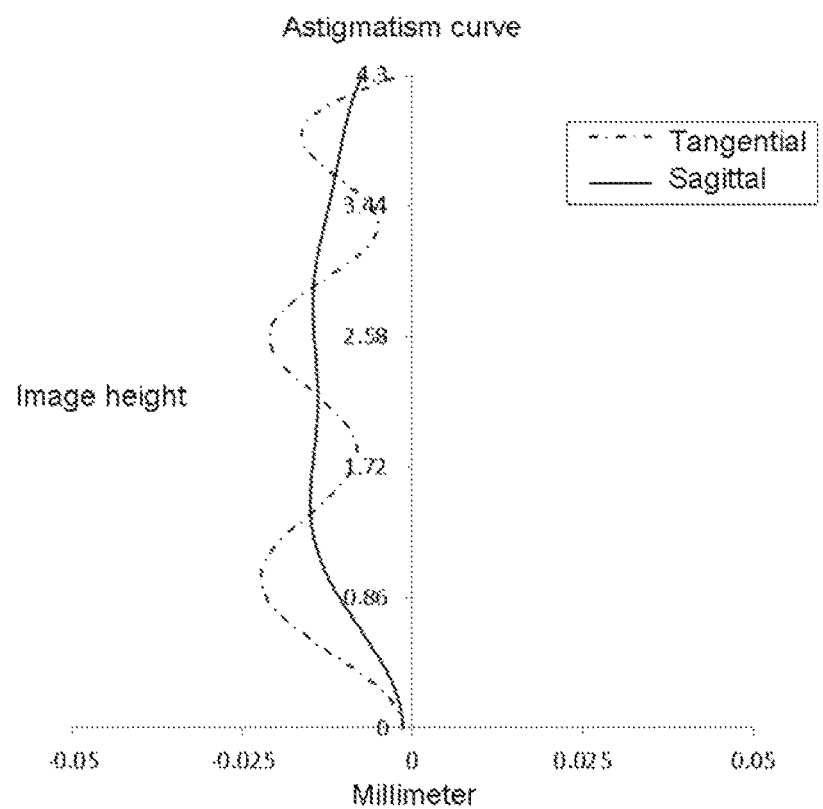
Figure 2C:
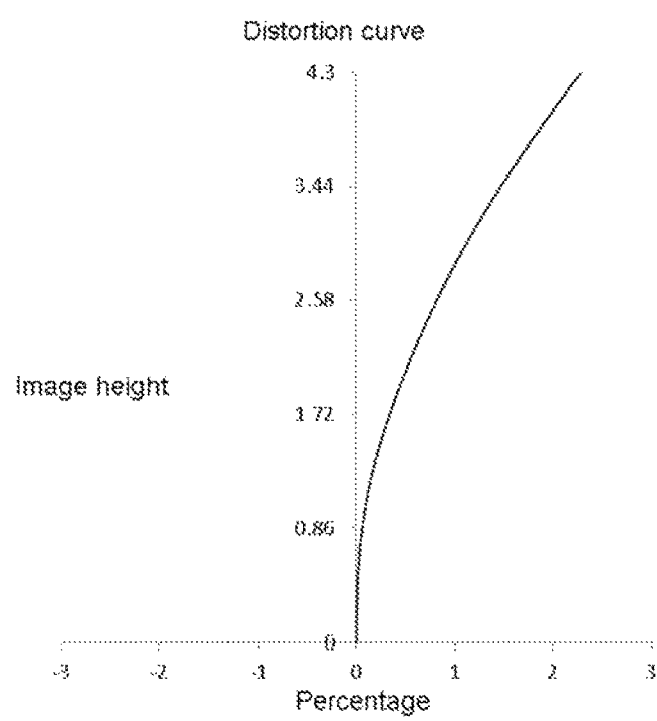
Figure 2D:
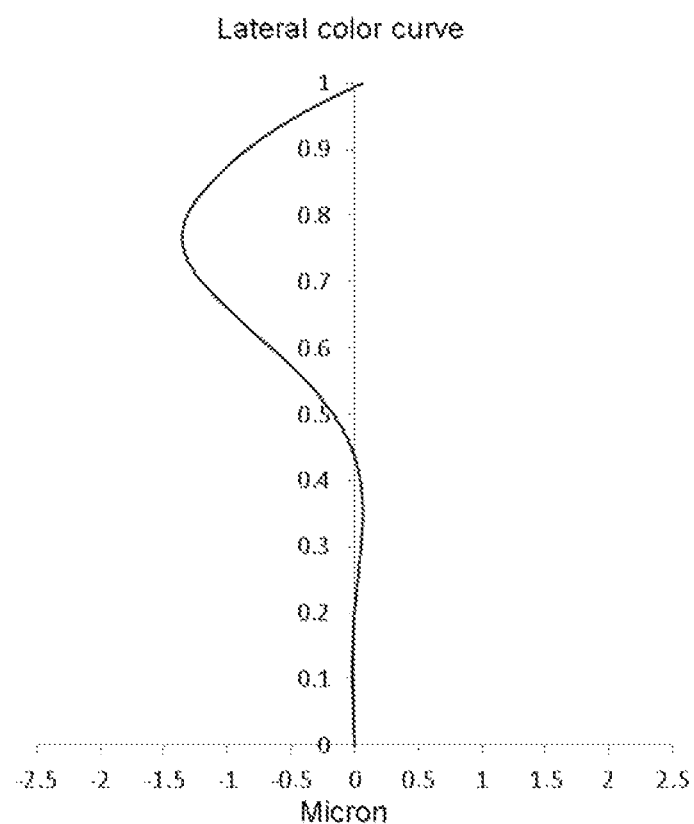

FIG. 2A shows a longitudinal aberration curve of the optical imaging lens group according to embodiment 1 to represent deviation of a convergence focal point after light with different wavelengths passes through the lens. FIG. 2B shows an astigmatism curve of the optical imaging lens group according to embodiment 1 to represent a tangential image surface curvature and a sagittal image surface curvature. FIG. 2C shows a distortion curve of the optical imaging lens group according to embodiment 1 to represent distortion values corresponding to different image heights. FIG. 2D shows a lateral color curve of the optical imaging lens group according to embodiment 1 to represent deviation of different image heights on the imaging surface after the light passes through the lens. According to FIG. 2A to FIG. 2D, it can be seen that the optical imaging lens group provided in embodiment 1 may achieve high imaging quality.

Embodiment 2

An optical imaging lens group according to embodiment 2 of the disclosure will be described below with reference to FIG. 3 to FIG. 4D. In the embodiment and the following embodiments, part of descriptions similar to those about embodiment 1 are omitted for simplicity. FIG. 3 shows a structure diagram of an optical imaging lens group according to embodiment 2 of the disclosure.

while an image-side surface S8 is a concave surface. The fifth lens E5 has a positive refractive power, an object-side surface S9 thereof is a concave surface, while an image-side surface S10 is a convex surface. The sixth lens E6 has a negative refractive power, an object-side surface S11 thereof is a convex surface, while an image-side surface S12 is a concave surface. An optical filter E7 has an object-side surface S13 and an image-side surface S14. Light from an object sequentially penetrates through each of the surfaces S1 to S14 and is finally imaged on the imaging surface S15.

In the example, f is a total effective focal length of the optical imaging lens group f meet 23.70 mm, a TTL of the optical imaging lens group is 20.20 mm, ImgH is a half of a diagonal length of an effective pixel region on the imaging surface S15 of the optical imaging lens group, ImgH is 4.23 mm, ω is a half of a maximum field of view of the optical imaging lens group, ω is 9.9°, Fno is an F-number, and Fno is 3.04.

Table 3 shows a basic parameter table of the optical imaging lens group of embodiment 2, and units of the curvature radius, the thickness/distance and the focal length are all millimeter (mm). Table 4 shows high-order coefficients applied to each aspheric mirror surface in embodiment 2. A surface type of each aspheric surface may be defined by the formula (1) given in embodiment 1.

TABLE 3

| Surface number | Surface type | Curvature radius | Thickness/ distance | Material | | Focal length | Conic coefficient |
|---|---|---|---|---|---|---|---|
| | | | | Refractive index | Abbe number | | |
| OBJ | Spherical | Infinite | Infinite | | | | |
| STO | Spherical | Infinite | −1.1264 | | | | |
| S1 | Aspheric | 5.8718 | 2.1900 | 1.55 | 56.1 | 11.76 | −0.0778 |

TABLE 3-continued

| Surface number | Surface type | Curvature radius | Thickness/ distance | Material Refractive index | Abbe number | Focal length | Conic coefficient |
|---|---|---|---|---|---|---|---|
| S2 | Aspheric | 59.1867 | 0.5390 | | | | −89.2753 |
| S3 | Aspheric | 38.8170 | 1.2169 | 1.55 | 56.1 | 74.61 | 99.0000 |
| S4 | Aspheric | 800.0000 | 0.0949 | | | | −99.0000 |
| S5 | Aspheric | −97.3589 | 0.5277 | 1.62 | 23.5 | −11.96 | −20.6334 |
| S6 | Aspheric | 8.4087 | 0.6282 | | | | 2.9818 |
| S7 | Aspheric | 6.2654 | 0.7458 | 1.55 | 56.1 | 46.38 | −0.4530 |
| S8 | Aspheric | 7.9727 | 4.6592 | | | | −1.9565 |
| S9 | Aspheric | −11.5848 | 0.4645 | 1.67 | 20.4 | 20.74 | −4.0275 |
| S10 | Aspheric | −6.4118 | 0.0683 | | | | −0.7729 |
| S11 | Aspheric | 806.1804 | 0.3833 | 1.55 | 56.1 | −12.91 | −99.0000 |
| S12 | Aspheric | 6.9926 | 3.8913 | | | | 2.1243 |
| S13 | Spherical | Infinite | 0.3300 | 1.51 | 64.2 | | |
| S14 | Spherical | Infinite | 4.4608 | | | | |
| S15 | Spherical | Infinite | | | | | |

TABLE 4

| Surface number | A4 | A6 | A8 | A10 | A12 | A14 | A16 | A18 | A20 |
|---|---|---|---|---|---|---|---|---|---|
| S1 | −2.2798E−04 | −2.0757E−05 | 9.5516E−06 | −2.8716E−06 | 4.3990E−07 | −4.4309E−08 | 2.9316E−09 | −1.1339E−10 | 1.8920E−12 |
| S2 | −2.2255E−04 | 1.7556E−04 | −5.5004E−05 | 9.6840E−06 | −1.4182E−06 | 1.6605E−07 | −1.2537E−08 | 5.0661E−10 | −8.1812E−12 |
| S3 | 1.2410E−05 | 1.8590E−04 | −1.4518E−04 | 5.5968E−05 | −1.2172E−05 | 1.5972E−06 | −1.2538E−07 | 5.3855E−09 | −9.6557E−11 |
| S4 | −5.0318E−03 | 6.8772E−03 | −4.0030E−03 | 1.3754E−03 | −2.9096E−04 | 3.8374E−05 | −3.0750E−06 | 1.3703E−07 | −2.6034E−09 |
| S5 | −6.7667E−04 | 1.0769E−02 | −6.6003E−03 | 2.2067E−03 | −4.5873E−04 | 6.0558E−05 | −4.9216E−06 | 2.2427E−07 | −4.3866E−09 |
| S6 | 2.8655E−03 | 8.5148E−03 | −4.8867E−03 | 1.4395E−03 | −2.4249E−04 | 2.0879E−05 | −1.5558E−07 | −1.1376E−07 | 6.0722E−09 |
| S7 | −6.7505E−03 | 5.3807E−03 | −2.6081E−03 | 8.0252E−04 | −1.5997E−04 | 2.0495E−05 | −1.4928E−06 | 4.3517E−08 | 3.3791E−10 |
| S8 | −6.0721E−03 | 2.1382E−03 | −9.1392E−04 | 2.2095E−04 | −1.7578E−05 | −4.7935E−06 | 1.5220E−06 | −1.6946E−07 | 7.0846E−09 |
| S9 | 1.7946E−03 | −6.6801E−03 | 5.7947E−03 | −3.1391E−03 | 1.0195E−03 | −2.0249E−04 | 2.4268E−05 | −1.6294E−06 | 4.7779E−08 |
| S10 | 1.6194E−03 | −9.8596E−03 | 1.1263E−02 | −6.9094E−03 | 2.3934E−03 | −4.9217E−04 | 5.9909E−05 | −4.0088E−06 | 1.1433E−07 |
| S11 | −3.4039E−02 | 3.6903E−03 | 6.4291E−03 | −5.7675E−03 | 2.2796E−03 | −5.0227E−04 | 6.3693E−05 | −4.3562E−06 | 1.2471E−07 |
| S12 | −3.5504E−02 | 1.0968E−02 | −3.4160E−03 | 7.4041E−04 | −8.9335E−05 | 2.7223E−06 | 6.3696E−07 | −7.6056E−08 | 2.6040E−09 |

Figure 4A:
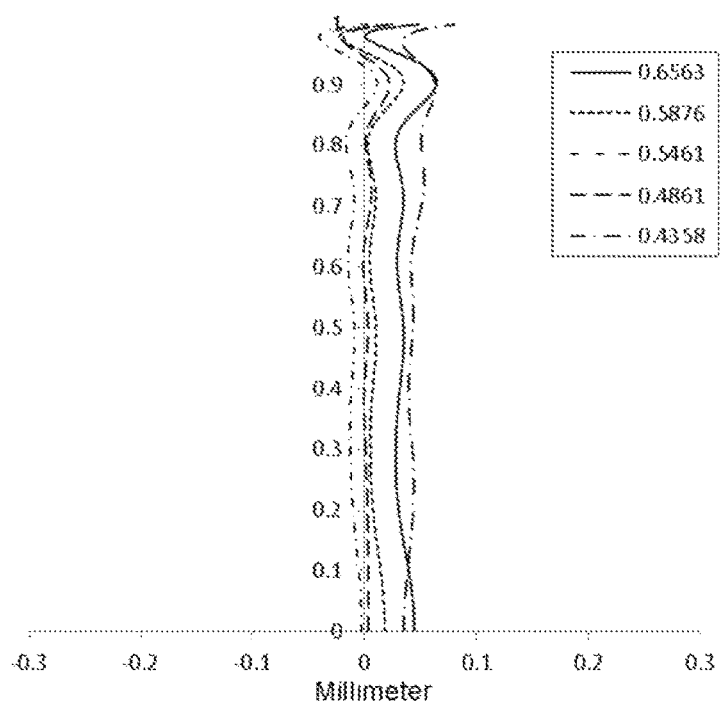
FIG. 4A to FIG. 4D show a longitudinal aberration curve, an astigmatism curve, a distortion curve, and a lateral color curve of an optical imaging lens group according to embodiment 2 respectively.
Figure 4B:
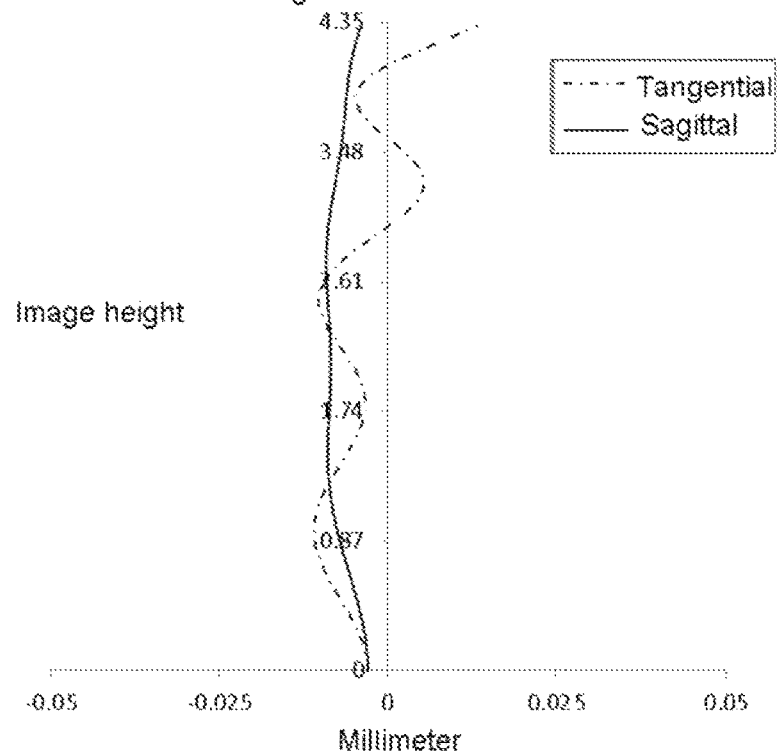
Figure 4C:
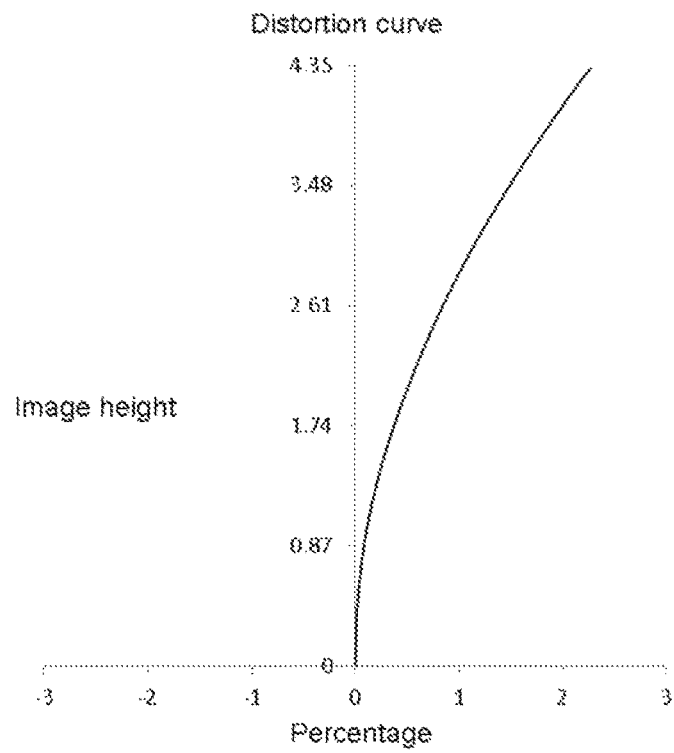
Figure 4D:
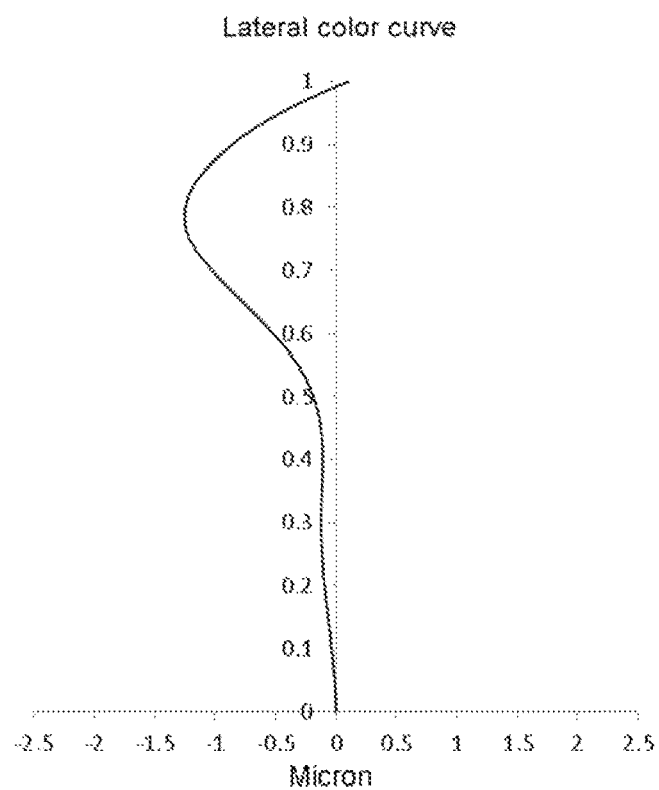

FIG. 4A shows a longitudinal aberration curve of the optical imaging lens group according to embodiment 2 to represent deviation of a convergence focal point after light with different wavelengths passes through the lens. FIG. 4B shows an astigmatism curve of the optical imaging lens group according to embodiment 2 to represent a tangential image surface curvature and a sagittal image surface curvature. FIG. 4C shows a distortion curve of the optical imaging lens group according to embodiment 2 to represent distortion values corresponding to different image heights. FIG. 4D shows a lateral color curve of the optical imaging lens group according to embodiment 2 to represent deviation of different image heights on the imaging surface after the light passes through the lens. According to FIG. 4A to FIG. 4D, it can be seen that the optical imaging lens group provided in embodiment 2 may achieve high imaging quality.

Embodiment 3

Figure 5:
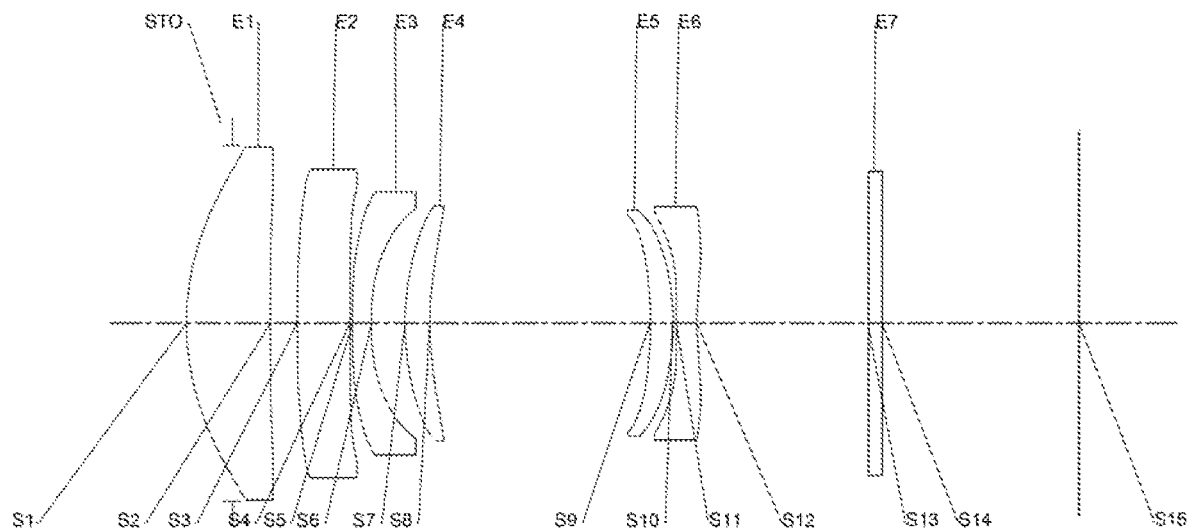
FIG. 5 shows a structure diagram of an optical imaging lens group according to embodiment 3 of the disclosure.

An optical imaging lens group according to embodiment 3 of the disclosure is described below with reference to FIG. 5 to FIG. 6D. FIG. 5 is a structure diagram of an optical imaging lens group according to embodiment 3 of the disclosure.

As shown in FIG. 5, the optical imaging lens group sequentially includes, from an object side to an image side, a diaphragm STO, a first lens E1, a second lens E2, a third lens E3, a fourth lens E4, a fifth lens E5, a sixth lens E6, an optical filter E7, and an imaging surface S15.

The first lens E1 has a positive refractive power, an object-side surface S1 thereof is a convex surface, while an image-side surface S2 is a concave surface. The second lens E2 has a positive refractive power, an object-side surface S3 thereof is a convex surface, while an image-side surface S4 is a concave surface. The third lens E3 has a negative refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a concave surface. The fifth lens E5 has a positive refractive power, an object-side surface S9 thereof is a concave surface, while an image-side surface S10 is a convex surface. The sixth lens E6 has a negative refractive power, an object-side surface S11 thereof is a convex surface, while an image-side surface S12 is a concave surface. An optical filter E7 has an object-side surface S13 and an image-side surface S14. Light from an object sequentially penetrates through each of the surfaces S1 to S14 and is finally imaged on the imaging surface S15.

In the example, f is a total effective focal length of the optical imaging lens group, f meet 23.90 mm, a TTL of the optical imaging lens group is 20.30 mm, ImgH is a half of a diagonal length of an effective pixel region on the imaging surface S15 of the optical imaging lens group, ImgH is 4.33 mm, ω is a half of a maximum field of view of the optical imaging lens group, ω is 10.0°, Fno is an F-number, and Fno is 3.08.

Table 5 shows a basic parameter table of the optical imaging lens group of embodiment 3, and units of the curvature radius, the thickness/distance and the focal length are all millimeter (mm). Table 6 shows high-order coefficients applied to each aspheric mirror surface in embodiment 3. A surface type of each aspheric surface may be defined by the formula (1) given in embodiment 1.

TABLE 5

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −1.0551 | | | | |
| S1 | Aspheric | 5.9732 | 1.8968 | 1.55 | 56.1 | 11.86 | −0.1138 |
| S2 | Aspheric | 67.7930 | 0.6311 | | | | −40.1082 |
| S3 | Aspheric | 37.3156 | 1.2025 | 1.55 | 56.1 | 71.58 | 98.2743 |
| S4 | Aspheric | 800.0000 | 0.0500 | | | | −99.0000 |
| S5 | Aspheric | 32.4377 | 0.4328 | 1.62 | 23.5 | −12.91 | −77.9507 |
| S6 | Aspheric | 6.5997 | 0.7643 | | | | 2.3922 |
| S7 | Aspheric | 6.2028 | 0.5621 | 1.55 | 56.1 | 60.42 | −0.1450 |
| S8 | Aspheric | 7.3930 | 5.0164 | | | | −2.3041 |
| S9 | Aspheric | −10.2035 | 0.5185 | 1.67 | 20.4 | 24.99 | −7.4277 |
| S10 | Aspheric | −6.4623 | 0.0744 | | | | −0.7340 |
| S11 | Aspheric | 30.4125 | 0.4684 | 1.55 | 56.1 | −14.29 | 92.7933 |
| S12 | Aspheric | 6.1803 | 3.8916 | | | | 1.9570 |
| S13 | Spherical | Infinite | 0.3300 | 1.51 | 64.2 | | |
| S14 | Spherical | Infinite | 4.4611 | | | | |
| S15 | Spherical | Infinite | | | | | |

TABLE 6

| Surface number | A4 | A6 | A8 | A10 | A12 | A14 | A16 | A18 | A20 |
|---|---|---|---|---|---|---|---|---|---|
| S1 | −3.3435E−04 | 3.3406E−05 | −6.8710E−06 | −1.3221E−06 | 5.9828E−07 | −9.2693E−08 | 7.2991E−09 | −2.9233E−10 | 4.7178E−12 |
| S2 | −5.0497E−04 | 5.9171E−04 | −2.8534E−04 | 7.3811E−05 | −1.1472E−05 | 1.0956E−06 | −6.2795E−08 | 1.9768E−09 | −2.6202E−11 |
| S3 | 9.3637E−05 | 3.8722E−04 | −3.0656E−04 | 1.0969E−04 | −2.1761E−05 | 2.5750E−06 | −1.8175E−07 | 7.0813E−09 | −1.1729E−10 |
| S4 | −5.8513E−03 | 7.2648E−03 | −3.7714E−03 | 1.1254E−03 | −2.0453E−04 | 2.3118E−05 | −1.5926E−06 | 6.1600E−08 | −1.0327E−09 |
| S5 | −3.0074E−03 | 1.2935E−02 | −7.2464E−03 | 2.1597E−03 | −3.8829E−04 | 4.3274E−05 | −2.9103E−06 | 1.0772E−07 | −1.6823E−09 |
| S6 | 9.8362E−04 | 1.0273E−02 | −5.4611E−03 | 1.3128E−03 | −1.0400E−04 | −1.9751E−05 | 5.7098E−06 | −5.3985E−07 | 1.8519E−08 |
| S7 | −8.0369E−03 | 6.0949E−03 | −2.2550E−03 | 3.0108E−04 | 7.5375E−05 | −3.8538E−05 | 6.8811E−06 | −5.8995E−07 | 2.0221E−08 |
| S8 | −7.5417E−03 | 3.1131E−03 | −8.4888E−04 | −1.0584E−04 | 1.5288E−04 | −4.9316E−05 | 8.0071E−06 | −6.7079E−07 | 2.3089E−08 |
| S9 | 2.4723E−03 | −7.0383E−03 | 6.0418E−03 | −3.1372E−03 | 9.5061E−04 | −1.7095E−04 | 1.7762E−05 | −9.7427E−07 | 2.1265E−08 |
| S10 | −5.5028E−03 | −1.2459E−03 | 5.5301E−03 | −4.3395E−03 | 1.6106E−03 | −3.3357E−04 | 3.9529E−05 | −2.5122E−06 | 6.6504E−08 |
| S11 | −4.2502E−02 | 1.4401E−02 | −1.0925E−03 | −2.5351E−03 | 1.3862E−03 | −3.4203E−04 | 4.5616E−05 | −3.1859E−06 | 9.1549E−08 |
| S12 | −3.4526E−02 | 1.1221E−02 | −4.1011E−03 | 1.0916E−03 | −1.8616E−04 | 1.8926E−05 | −1.0086E−06 | 1.7693E−08 | 3.0234E−10 |

Figure 6A:
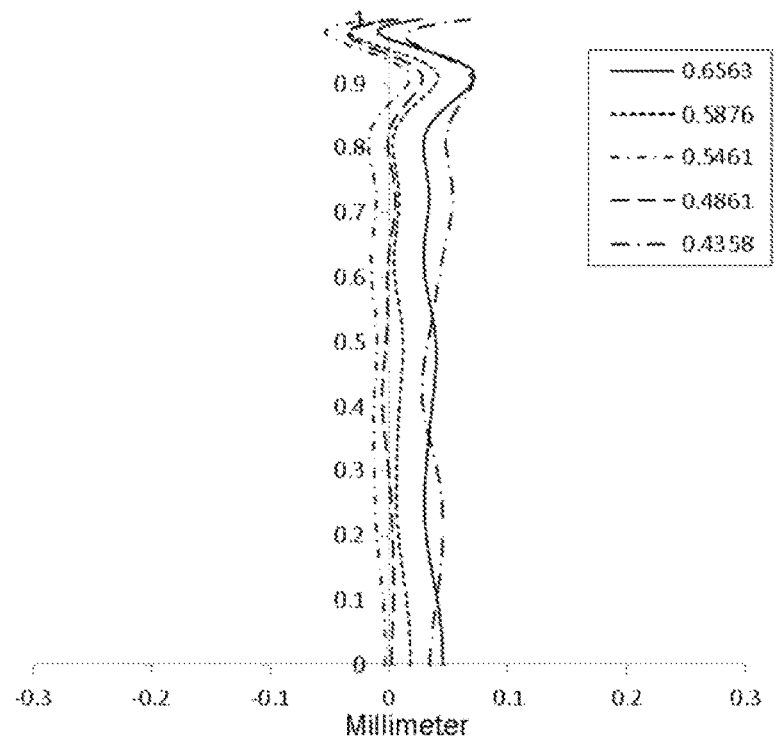
FIG. 6A to FIG. 6D show a longitudinal aberration curve, an astigmatism curve, a distortion curve, and a lateral color curve of an optical imaging lens group according to embodiment 3 respectively.
Figure 6B:
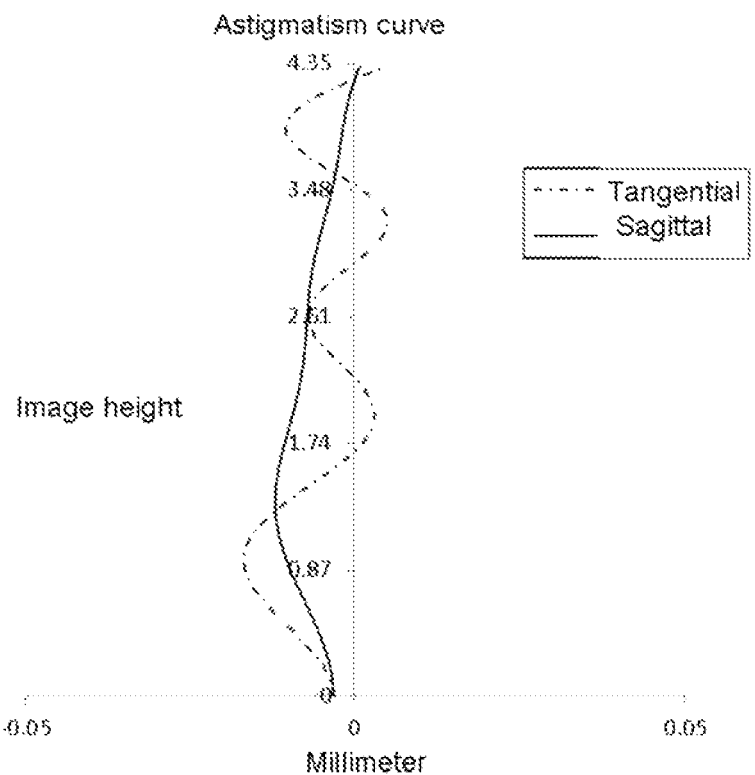
Figure 6C:
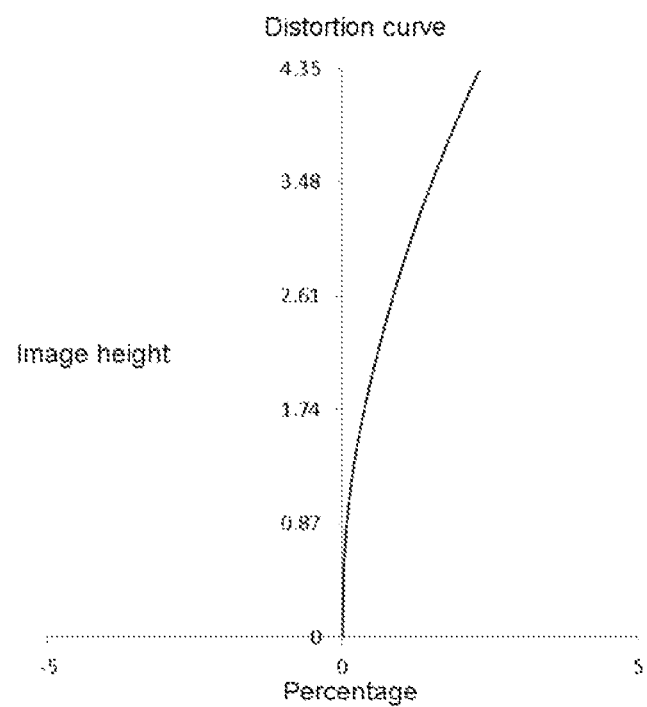
Figure 6D:
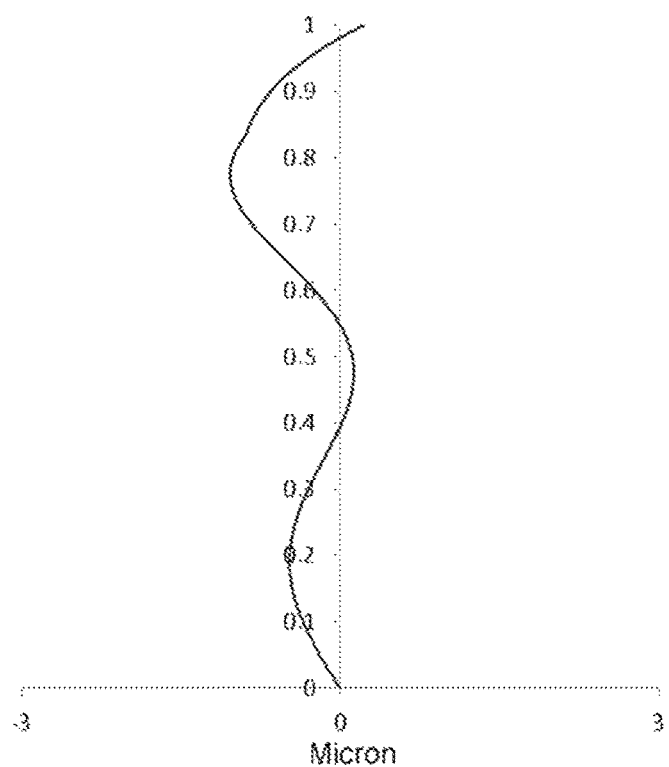

FIG. 6A shows a longitudinal aberration curve of the optical imaging lens group according to embodiment 3 to represent deviation of a convergence focal point after light with different wavelengths passes through the lens. FIG. 6B shows an astigmatism curve of the optical imaging lens group according to embodiment 3 to represent a tangential image surface curvature and a sagittal image surface curvature. FIG. 6C shows a distortion curve of the optical imaging lens group according to embodiment 3 to represent distortion values corresponding to different image heights. FIG. 6D shows a lateral color curve of the optical imaging lens group according to embodiment 3 to represent deviation of different image heights on the imaging surface after the light passes through the lens. According to FIG. 6A to FIG. 6D, it can be seen that the optical imaging lens group provided in embodiment 3 may achieve high imaging quality.

Embodiment 4

Figure 7:
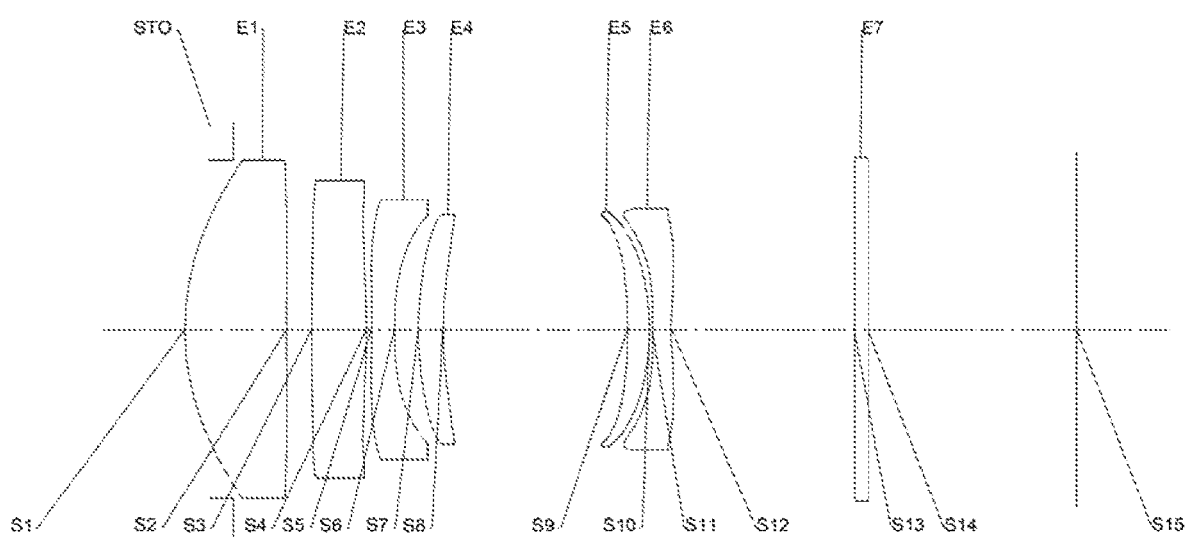
FIG. 7 shows a structure diagram of an optical imaging lens group according to embodiment 4 of the disclosure.

An optical imaging lens group according to embodiment 4 of the disclosure is described below with reference to FIG. 7 to FIG. 8D. FIG. 7 shows a structure diagram of an optical imaging lens group according to embodiment 4 of the disclosure.

As shown in FIG. 7, the optical imaging lens group sequentially includes, from an object side to an image side, a diaphragm STO, a first lens E1, a second lens E2, a third lens E3, a fourth lens E4, a fifth lens E5, a sixth lens E6, an optical filter E7, and an imaging surface S15.

The first lens E1 has a positive refractive power, an object-side surface S1 thereof is a convex surface, while an image-side surface S2 is a concave surface. The second lens E2 has a positive refractive power, an object-side surface S3 thereof is a convex surface, while an image-side surface S4 is a convex surface. The third lens E3 has a negative refractive power, an object-side surface S5 thereof is a concave surface, while an image-side surface S6 is a concave surface. The fourth lens E4 has a positive refractive power, an object-side surface S7 thereof is a convex surface, while an image-side surface S8 is a concave surface. The fifth lens E5 has a positive refractive power, an object-side surface S9 thereof is a concave surface, while an image-side surface S10 is a convex surface. The sixth lens E6 has a negative refractive power, an object-side surface S11 thereof is a convex surface, while an image-side surface S12 is a concave surface. An optical filter E7 has an object-side surface S13 and an image-side surface S14. Light from an object sequentially penetrates through each of the surfaces S1 to S14 and is finally imaged on the imaging surface S15.

In the example, f is a total effective focal length of the optical imaging lens group, f is 23.90 mm, a TTL of the optical imaging lens group is 20.30 mm, ImgH is a half of a diagonal length of an effective pixel region on the imaging surface S15 of the optical imaging lens group, ImgH is 4.33 mm, ω is a half of a maximum field of view of the optical imaging lens group, ω is 10.0°, Fno is an F-number, and Fno is 3.07.

Table 7 shows a basic parameter table of the optical imaging lens group of embodiment 4, and units of the curvature radius, the thickness/distance and the focal length are all millimeter (mm). Table 8 shows high-order coefficients applied to each aspheric mirror surface in embodiment 4. A surface type of each aspheric surface may be defined by the formula (1) given in embodiment 1.

TABLE 7

| Surface number | Surface type | Curvature radius | Thickness/distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −1.1045 | | | | |
| S1 | Aspheric | 5.9550 | 2.3128 | 1.55 | 56.1 | 11.02 | −0.0562 |
| S2 | Aspheric | 457.5211 | 0.5829 | | | | 24.0145 |
| S3 | Aspheric | 132.0986 | 1.2415 | 1.55 | 56.1 | 37.17 | 98.1637 |
| S4 | Aspheric | −23.9231 | 0.1210 | | | | −30.4785 |
| S5 | Aspheric | −26.7494 | 0.5170 | 1.62 | 23.5 | −11.04 | 22.9354 |
| S6 | Aspheric | 9.7997 | 0.5410 | | | | 2.6115 |
| S7 | Aspheric | 7.9114 | 0.5626 | 1.55 | 56.1 | 248.16 | −0.1231 |
| S8 | Aspheric | 8.1904 | 4.2127 | | | | −2.5587 |
| S9 | Aspheric | −11.1145 | 0.4917 | 1.67 | 20.4 | 19.27 | −4.5519 |
| S10 | Aspheric | −6.0715 | 0.0668 | | | | −0.8685 |
| S11 | Aspheric | 400.4943 | 0.4247 | 1.55 | 56.1 | −12.85 | 74.4003 |
| S12 | Aspheric | 6.8989 | 4.1629 | | | | 2.1374 |
| S13 | Spherical | Infinite | 0.3300 | 1.51 | 64.2 | | |
| S14 | Spherical | Infinite | 4.7324 | | | | |
| S15 | Spherical | Infinite | | | | | |

TABLE 8

| Surface number | A4 | A6 | A8 | A10 | A12 | A14 | A16 | A18 | A20 |
|---|---|---|---|---|---|---|---|---|---|
| S1 | −2.3991E−04 | 6.9075E−07 | 2.3751E−06 | −1.3122E−06 | 1.8757E−07 | −1.3199E−08 | 4.5147E−10 | −6.3399E−12 | 1.6909E−14 |
| S2 | −2.7883E−04 | 2.0533E−04 | −5.4809E−05 | 3.9194E−06 | 5.8745E−07 | −1.3815E−07 | 1.1073E−08 | −4.0902E−10 | 5.8350E−12 |
| S3 | 7.8074E−05 | −9.3782E−06 | 6.0717E−06 | −2.3865E−06 | 6.4692E−07 | −6.2479E−08 | −8.5265E−10 | 4.2302E−10 | −1.6126E−11 |
| S4 | −2.6422E−03 | 3.0728E−03 | −1.3392E−03 | 3.7947E−04 | −7.4268E−05 | 1.0079E−05 | −8.9654E−07 | 4.6349E−08 | −1.0422E−09 |
| S5 | 1.1459E−03 | 7.9332E−03 | −4.5951E−03 | 1.4347E−03 | −2.8536E−04 | 3.7493E−05 | −3.1578E−06 | 1.5429E−07 | −3.3179E−09 |
| S6 | 2.2955E−03 | 8.9761E−03 | −4.7502E−03 | 1.1284E−03 | −9.6050E−05 | −1.1314E−05 | 3.4211E−06 | −2.9761E−07 | 9.1025E−09 |
| S7 | −8.2175E−03 | 5.6741E−03 | −1.2607E−03 | −4.9624E−04 | 3.9600E−04 | −1.1009E−04 | 1.5834E−05 | −1.1744E−06 | 3.5646E−08 |
| S8 | −7.2469E−03 | 2.0930E−03 | 1.3803E−04 | −6.9953E−04 | 3.7481E−04 | −9.9225E−05 | 1.4516E−05 | −1.1223E−06 | 3.5949E−08 |
| S9 | 3.8657E−04 | −3.4559E−03 | 3.7962E−03 | −2.7649E−03 | 1.1146E−03 | −2.5944E−04 | 3.4708E−05 | −2.4607E−06 | 7.0493E−08 |
| S10 | −5.3709E−03 | 4.5915E−03 | 3.0714E−04 | −2.9644E−03 | 1.7575E−03 | −4.8942E−04 | 7.3784E−05 | −5.8186E−06 | 1.8843E−07 |
| S11 | −4.0334E−02 | 1.8660E−02 | −5.5938E−03 | −1.3473E−03 | 1.6212E−03 | −5.3919E−04 | 8.9919E−05 | −7.6713E−06 | 2.6726E−07 |
| S12 | −3.4851E−02 | 1.1774E−02 | −4.4538E−03 | 1.2116E−03 | −1.9159E−04 | 1.1802E−05 | 9.1031E−07 | −1.8168E−07 | 7.9544E−09 |

Figure 8A:
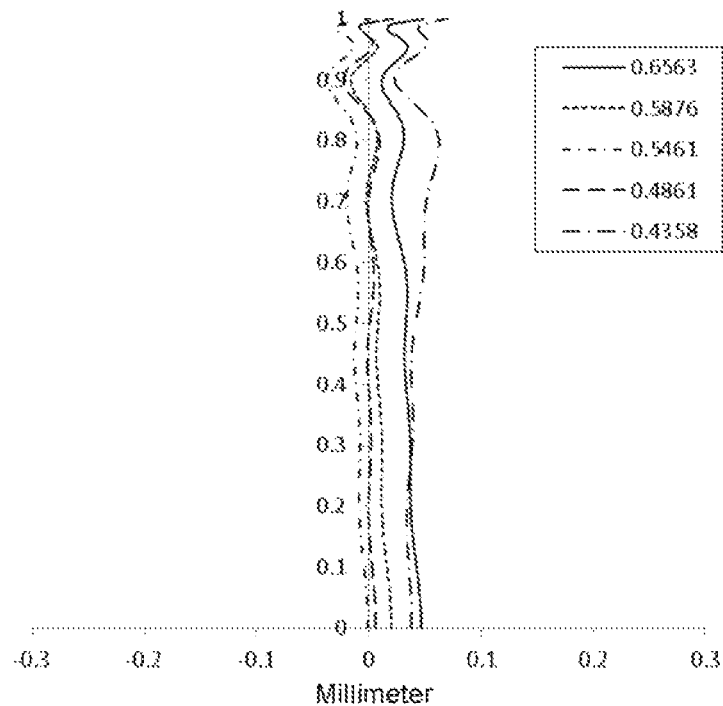
FIG. 8A to FIG. 8D show a longitudinal aberration curve, an astigmatism curve, a distortion curve, and a lateral color curve of an optical imaging lens group according to embodiment 4 respectively.
Figure 8B:
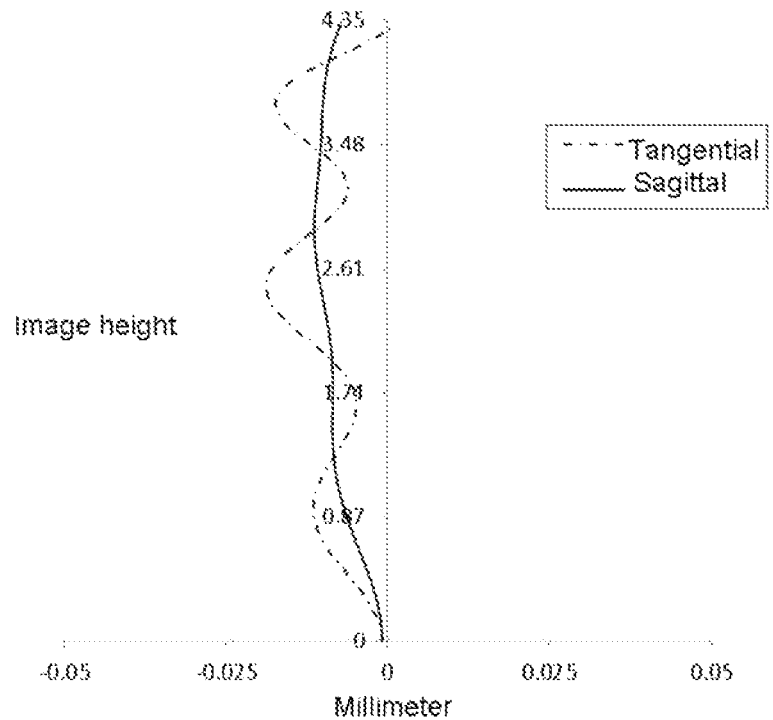
Figure 8C:
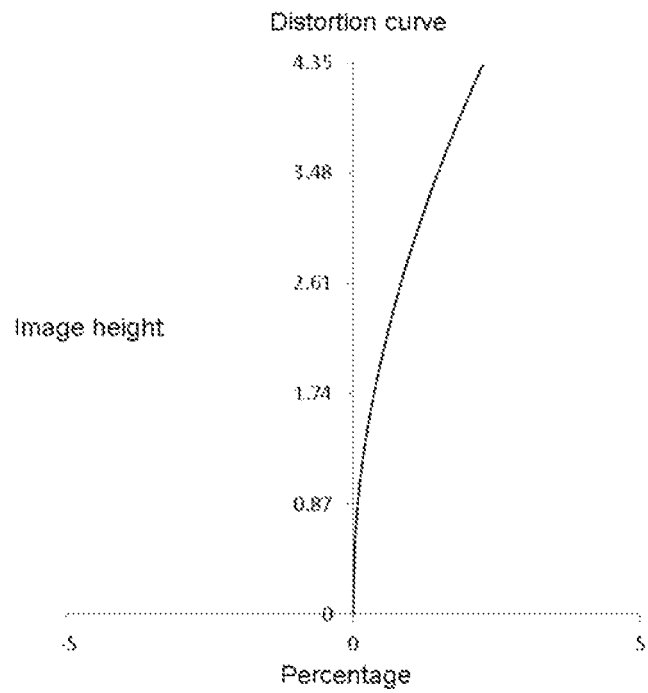
Figure 8D:
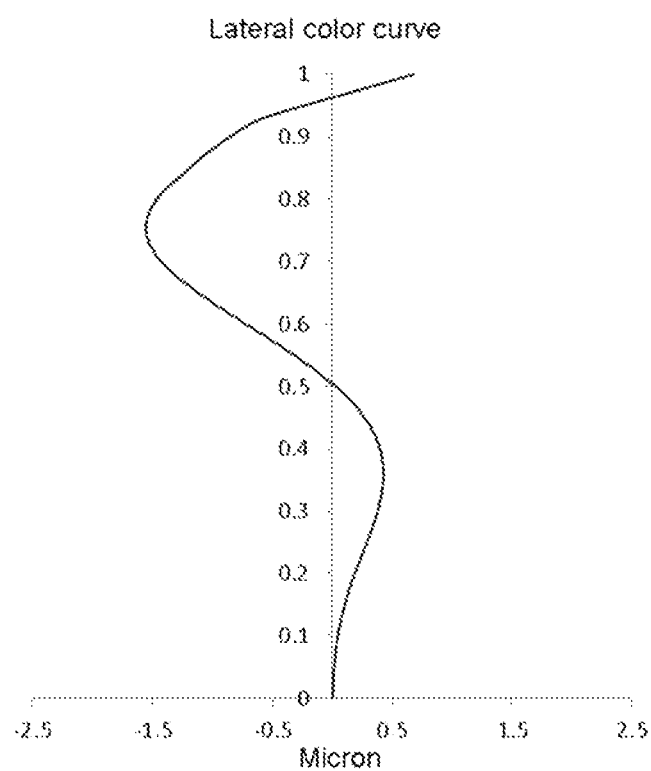

FIG. 8A shows a longitudinal aberration curve of the optical imaging lens group according to embodiment 4 to represent deviation of a convergence focal point after light with different wavelengths passes through the lens. FIG. 8B shows an astigmatism curve of the optical imaging lens group according to embodiment 4 to represent a tangential image surface curvature and a sagittal image surface curvature. FIG. 8C shows a distortion curve of the optical imaging lens group according to embodiment 4 to represent distortion values corresponding to different image heights. FIG. 8D shows a lateral color curve of the optical imaging lens group according to embodiment 4 to represent deviation of different image heights on the imaging surface after the light passes through the lens. According to FIG. 8A to FIG. 8D, it can be seen that the optical imaging lens group provided in embodiment 4 may achieve high imaging quality.

Embodiment 5

Figure 9:
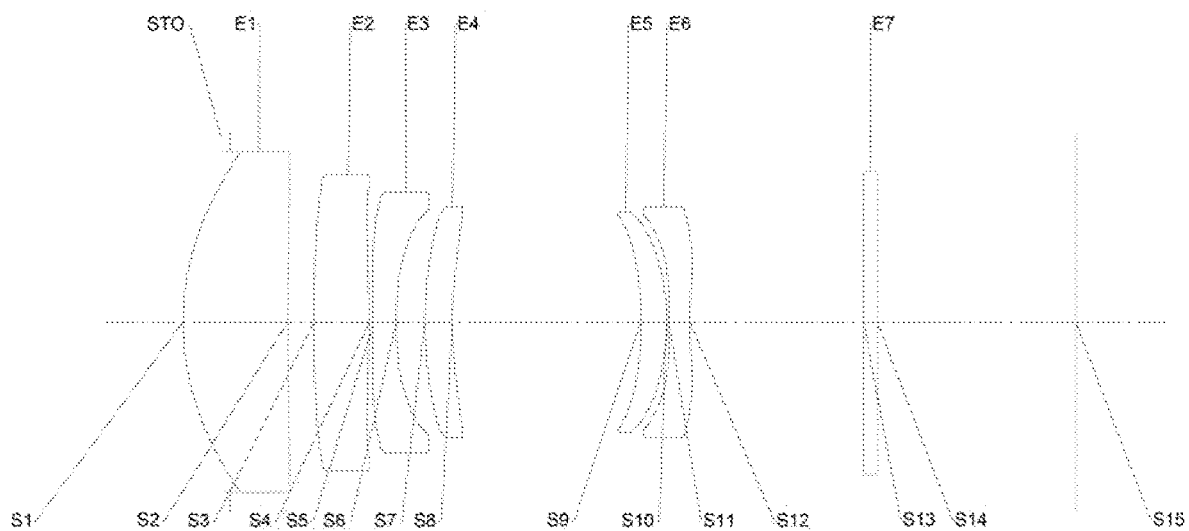
FIG. 9 shows a structure diagram of an optical imaging lens group according to embodiment 5 of the disclosure.

An optical imaging lens group according to embodiment 5 of the disclosure is described below with reference to FIG. 9 to FIG. 10D. FIG. 9 shows a structure diagram of an optical imaging lens group according to embodiment 5 of the disclosure.

As shown in FIG. 9, the optical imaging lens group sequentially includes, from an object side to an image side, a diaphragm STO, a first lens E1, a second lens E2, a third lens E3, a fourth lens E4, a fifth lens E5, a sixth lens E6, an optical filter E7, and an imaging surface S15.

The first lens E1 has a positive refractive power, an object-side surface S1 thereof is a convex surface, while an image-side surface S2 is a concave surface. The second lens E2 has a positive refractive power, an object-side surface S3 thereof is a convex surface, while an image-side surface S4 is a convex surface. The third lens E3 has a negative refractive power, an object-side surface S5 thereof is a concave surface, while an image-side surface S6 is a concave surface. The fourth lens E4 has a positive refractive power, an object-side surface S7 thereof is a convex surface, while an image-side surface S8 is a concave surface. The fifth lens E5 has a positive refractive power, an object-side surface S9 thereof is a concave surface, while an image-side surface S10 is a convex surface. The sixth lens E6 has a negative refractive power, an object-side surface S11 thereof is a convex surface, while an image-side surface S12 is a concave surface. An optical filter E7 has an object-side surface S13 and an image-side surface S14. Light from an object sequentially penetrates through each of the surfaces S1 to S14 and is finally imaged on the imaging surface S15.

In the example, f is a total effective focal length of the optical imaging lens group, f meet 23.70 mm, a TTL of the optical imaging lens group is 20.40 mm, ImgH is a half of a diagonal length of an effective pixel region on the imaging surface S15 of the optical imaging lens group, ImgH is 4.33 mm, ω is a half of a maximum field of view of the optical imaging lens group, ω is 10.2°, Fno is an F-number, and Fno is 3.05.

Table 9 shows a basic parameter table of the optical imaging lens group of embodiment 5, and units of the curvature radius, the thickness/distance and the focal length are all millimeter (mm). Table 10 shows high-order coefficients applied to each aspheric mirror surface in embodiment 5. A surface type of each aspheric surface may be defined by the formula (1) given in embodiment 1.

TABLE 9

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −1.0864 | | | | |
| S1 | Aspheric | 5.9723 | 2.3840 | 1.55 | 56.1 | 11.81 | −0.0792 |
| S2 | Aspheric | 68.7334 | 0.6124 | | | | −75.7903 |
| S3 | Aspheric | 38.2040 | 1.2622 | 1.55 | 56.1 | 30.53 | 99.0000 |
| S4 | Aspheric | −29.2778 | 0.0919 | | | | −42.7426 |
| S5 | Aspheric | −28.8173 | 0.5293 | 1.62 | 23.5 | −11.48 | 22.2059 |
| S6 | Aspheric | 10.0642 | 0.6522 | | | | 2.6494 |
| S7 | Aspheric | 8.8972 | 0.6229 | 1.55 | 56.1 | 1121.43 | −0.5259 |
| S8 | Aspheric | 8.8049 | 4.3159 | | | | −2.1705 |
| S9 | Aspheric | −8.0963 | 0.5834 | 1.67 | 20.4 | 21.44 | −3.4545 |
| S10 | Aspheric | −5.3222 | 0.0500 | | | | −1.2202 |
| S11 | Aspheric | 206.3260 | 0.4740 | 1.55 | 56.1 | −14.40 | −99.0000 |
| S12 | Aspheric | 7.5758 | 3.9612 | | | | 1.9271 |
| S13 | Spherical | Infinite | 0.3300 | 1.51 | 64.2 | | |
| S14 | Spherical | Infinite | 4.5351 | | | | |
| S15 | Spherical | Infinite | | | | | |

TABLE 10

| Surface number | A4 | A6 | A8 | A10 | A12 | A14 | A16 | A18 | A20 |
|---|---|---|---|---|---|---|---|---|---|
| S1 | −2.5504E−04 | 1.2190E−06 | −5.6937E−07 | −2.7927E−07 | 5.4529E−09 | 4.1813E−09 | −4.3265E−10 | 1.5042E−11 | −1.4635E−13 |
| S2 | −1.0366E−04 | 2.9643E−05 | 2.6110E−05 | −1.4579E−05 | 2.8365E−06 | −2.7973E−07 | 1.4677E−08 | −3.8041E−10 | 3.6724E−12 |
| S3 | 5.2007E−04 | −6.2548E−04 | 3.1433E−04 | −8.0305E−05 | 1.1425E−05 | −8.6253E−07 | 2.5616E−08 | 4.0906E−10 | −2.9656E−11 |
| S4 | −2.2447E−03 | 3.0874E−03 | −1.6594E−03 | 5.8269E−04 | −1.3228E−04 | 1.9095E−05 | −1.6810E−06 | 8.2004E−08 | −1.6941E−09 |
| S5 | −1.0408E−05 | 1.0273E−02 | −6.4599E−03 | 2.2154E−03 | −4.7417E−04 | 6.4700E−05 | −5.4530E−06 | 2.5831E−07 | −5.2585E−09 |
| S6 | 7.3848E−04 | 1.1660E−02 | −6.8356E−03 | 2.0082E−03 | −3.0537E−04 | 1.5423E−05 | 2.0175E−06 | −3.2422E−07 | 1.3172E−08 |
| S7 | −9.0396E−03 | 8.1330E−03 | −4.0140E−03 | 1.1185E−03 | −1.6063E−04 | 5.8679E−06 | 1.5284E−06 | −2.1400E−07 | 8.6172E−09 |
| S8 | −7.6648E−03 | 4.0092E−03 | −2.0821E−03 | 6.6056E−04 | −1.2021E−04 | 1.0343E−05 | 1.0134E−07 | −8.7922E−08 | 4.8083E−09 |
| S9 | 1.4675E−03 | −3.5778E−03 | 1.9905E−03 | −7.4418E−04 | 1.0674E−04 | 1.4268E−05 | −7.1167E−06 | 9.1104E−07 | −4.0498E−08 |
| S10 | −5.3243E−04 | −4.0023E−03 | 4.9747E−03 | −3.0959E−03 | 9.9757E−04 | −1.7786E−04 | 1.7246E−05 | −8.0044E−07 | 1.1435E−08 |
| S11 | −3.3667E−02 | 4.5985E−03 | 4.0682E−03 | −3.7544E−03 | 1.3928E−03 | −2.7804E−04 | 3.0791E−05 | −1.7485E−06 | 3.8326E−08 |
| S12 | −3.2832E−02 | 7.9632E−03 | −1.5497E−03 | 2.8475E−05 | 8.0535E−05 | −2.2691E−05 | 2.9504E−06 | −1.9315E−07 | 5.1386E−09 |

Figure 10A:
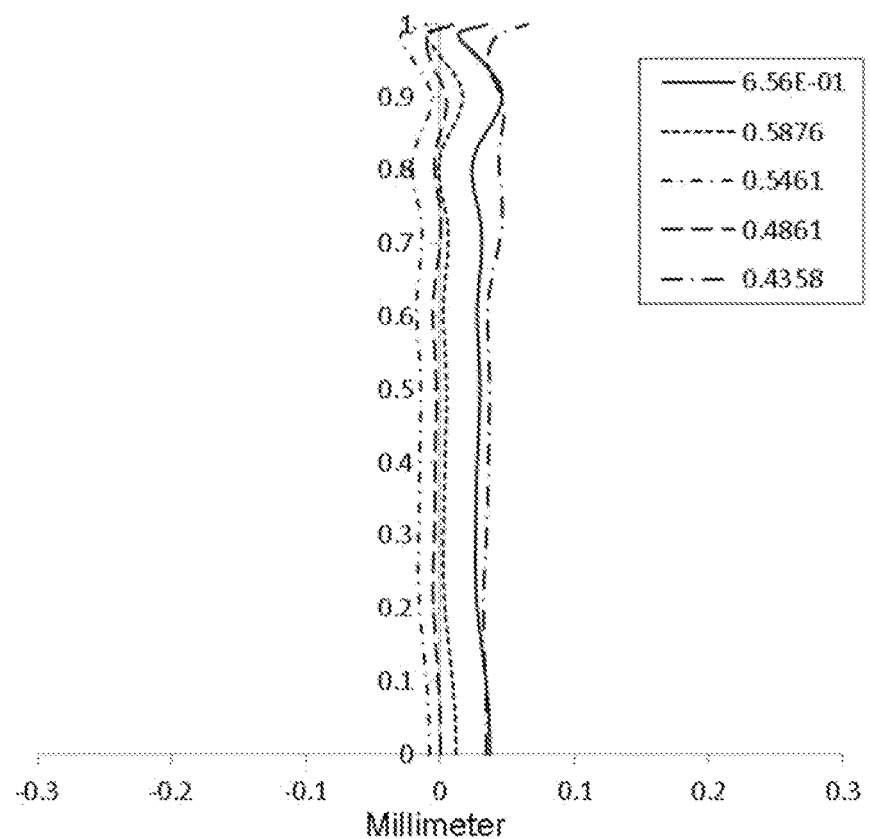
FIG. 10A to FIG. 10D show a longitudinal aberration curve, an astigmatism curve, a distortion curve, and a lateral color curve of an optical imaging lens group according to embodiment 5 respectively.
Figure 10B:
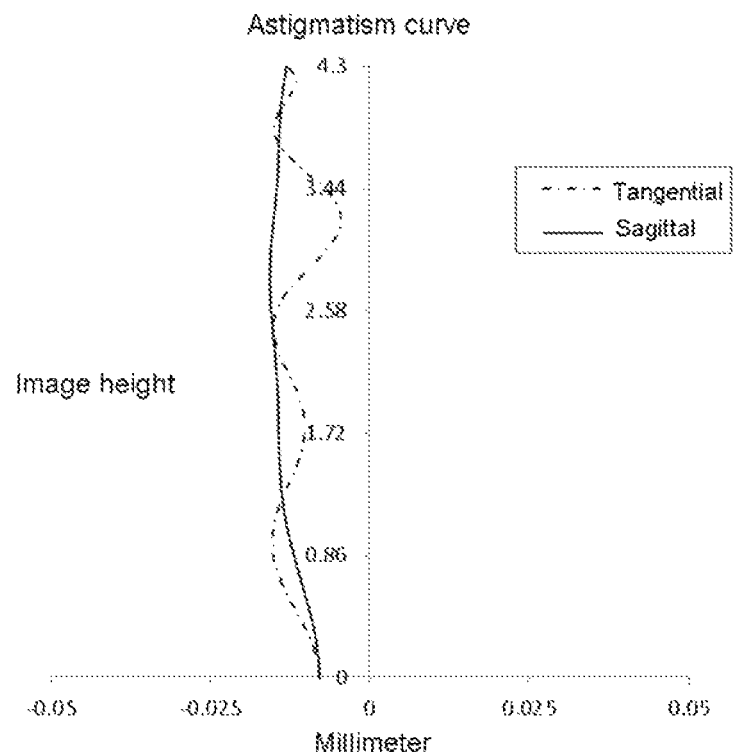
Figure 10C:
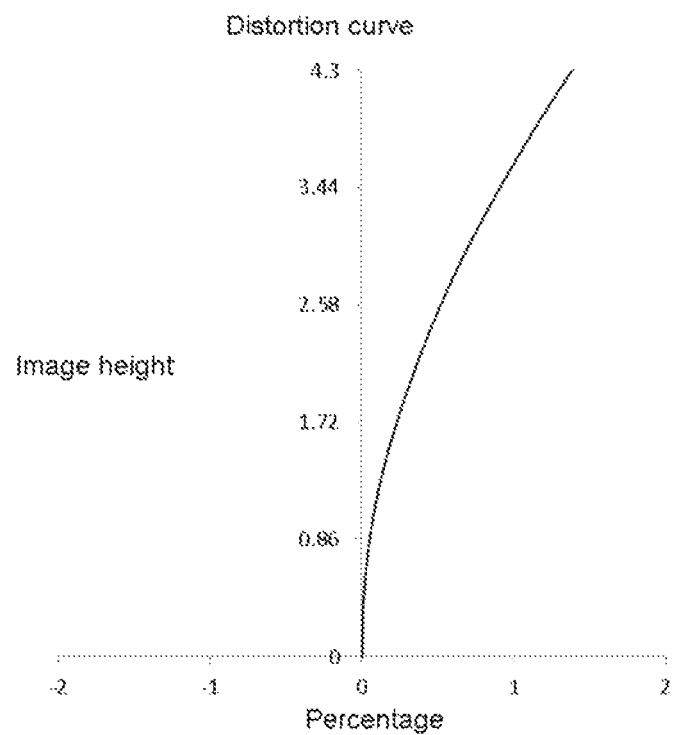
Figure 10D:
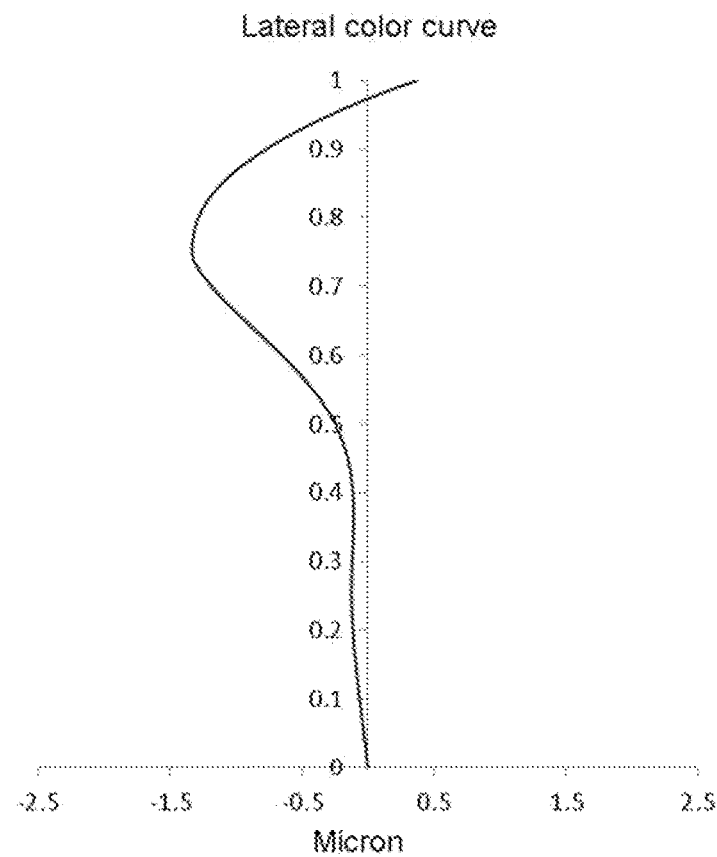

FIG. 10A shows a longitudinal aberration curve of the optical imaging lens group according to embodiment 5 to represent deviation of a convergence focal point after light with different wavelengths passes through the lens. FIG. 10B shows an astigmatism curve of the optical imaging lens group according to embodiment 5 to represent a tangential image surface curvature and a sagittal image surface curvature. FIG. 10C shows a distortion curve of the optical imaging lens group according to embodiment 5 to represent distortion values corresponding to different image heights. FIG. 10D shows a lateral color curve of the optical imaging lens group according to embodiment 5 to represent deviation of different image heights on the imaging surface after the light passes through the lens. According to FIG. 10A to FIG. 10D, it can be seen that the optical imaging lens group provided in embodiment 5 may achieve high imaging quality.

Embodiment 6

Figure 11:
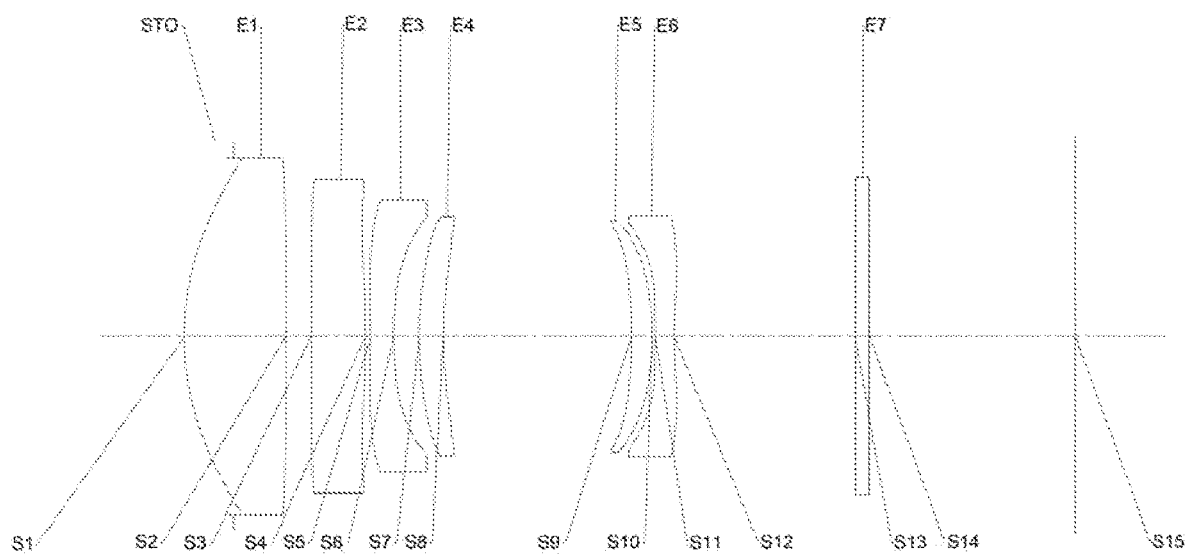
FIG. 11 shows a structure diagram of an optical imaging lens group according to embodiment 6 of the disclosure.

An optical imaging lens group according to embodiment 6 of the disclosure is described below with reference to FIG. 11 to FIG. 12D. FIG. 11 shows a structure diagram of an optical imaging lens group according to embodiment 6 of the disclosure.

As shown in FIG. 11, the optical imaging lens group sequentially includes, from an object side to an image side, a diaphragm STO, a first lens E1, a second lens E2, a third lens E3, a fourth lens E4, a fifth lens E5, a sixth lens E6, an optical filter E7, and an imaging surface S15.

The first lens E1 has a positive refractive power, an object-side surface S1 thereof is a convex surface, while an image-side surface S2 is a convex surface. The second lens E2 has a positive refractive power, an object-side surface S3 thereof is a convex surface, while an image-side surface S4 is a convex surface. The third lens E3 has a negative refractive power, an object-side surface S5 thereof is a concave surface, while an image-side surface S6 is a concave surface. The fourth lens E4 has a positive refractive power, an object-side surface S7 thereof is a convex surface, while an image-side surface S8 is a concave surface. The fifth lens E5 has a positive refractive power, an object-side surface S9 thereof is a concave surface, while an image-side surface S10 is a convex surface. The sixth lens E6 has a negative refractive power, an object-side surface S11 thereof is a convex surface, while an image-side surface S12 is a concave surface. An optical filter E7 has an object-side surface S13 and an image-side surface S14. Light from an object sequentially penetrates through each of the surfaces S1 to S14 and is finally imaged on the imaging surface S15.

In the example, f is a total effective focal length of the optical imaging lens group, f meet 24.00 mm, a TTL of the optical imaging lens group is 20.30 mm, ImgH is a half of a diagonal length of an effective pixel region on the imaging surface S15 of the optical imaging lens group, ImgH is 4.33 mm, ω is a half of a maximum field of view of the optical imaging lens group, ω is 10.0°, Fno is an F-number, and Fno is 3.06.

Table 11 shows a basic parameter table of the optical imaging lens group of embodiment 6, and units of the curvature radius, the thickness/distance and the focal length are all millimeter (mm). Table 11 shows high-order coefficients applied to each aspheric mirror surface in embodiment 6. A surface type of each aspheric surface may be defined by the formula (1) given in embodiment 1.

Figure 12A:
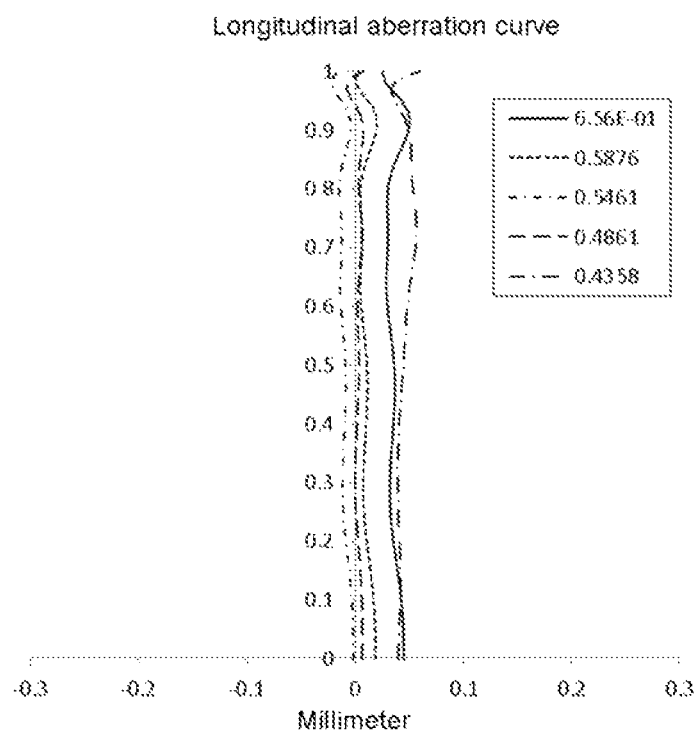
FIG. 12A to FIG. 12D show a longitudinal aberration curve, an astigmatism curve, a distortion curve, and a lateral color curve of an optical imaging lens group according to embodiment 6 respectively.
Figure 12B:
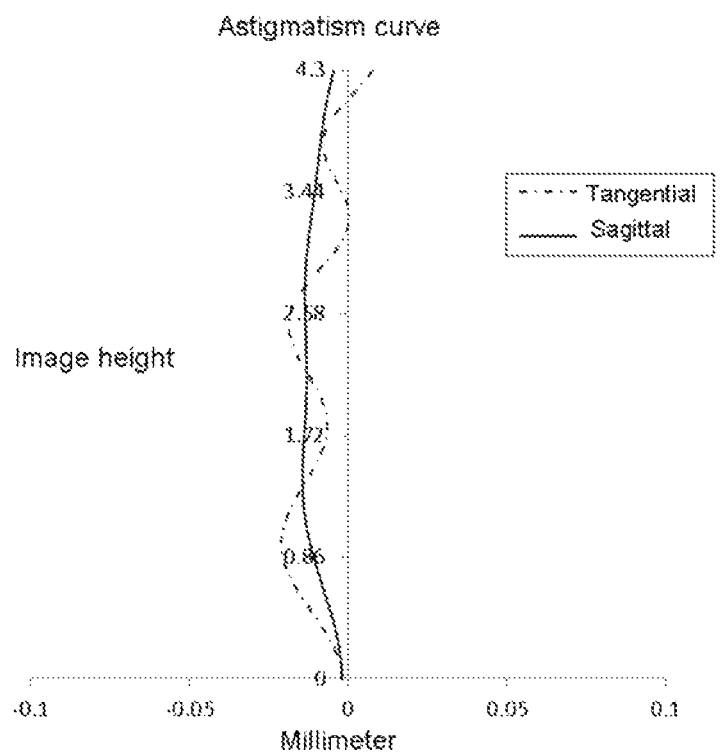
Figure 12C:
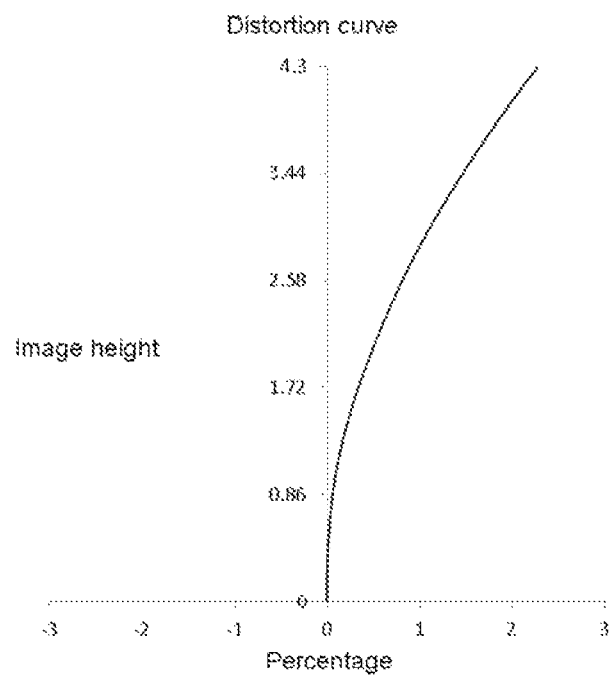
Figure 12D:
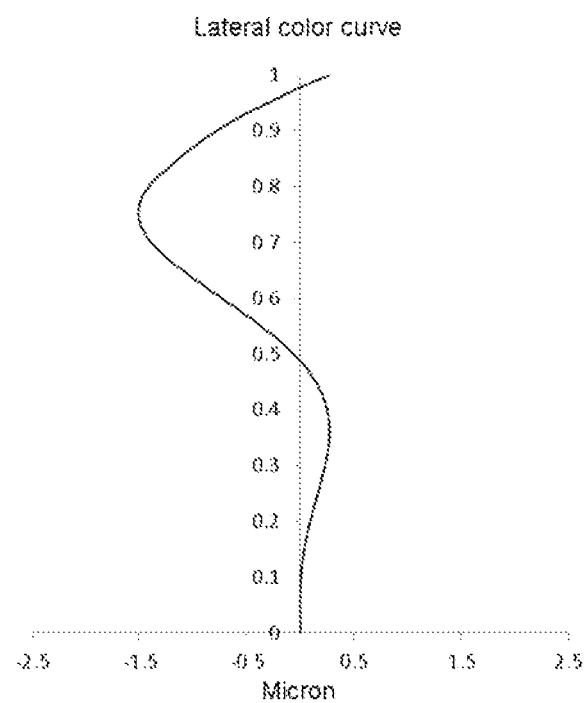

FIG. 12A shows a longitudinal aberration curve of the optical imaging lens group according to embodiment 6 to represent deviation of a convergence focal point after light with different wavelengths passes through the lens. FIG. 12B shows an astigmatism curve of the optical imaging lens group according to embodiment 6 to represent a tangential image surface curvature and a sagittal image surface curvature. FIG. 12C shows a distortion curve of the optical imaging lens group according to embodiment 6 to represent distortion values corresponding to different image heights. FIG. 12D shows a lateral color curve of the optical imaging lens group according to embodiment 6 to represent deviation of different image heights on the imaging surface after the light passes through the lens. According to FIG. 12A to FIG. 12D, it can be seen that the optical imaging lens group provided in embodiment 6 may achieve high imaging quality.

From the above, embodiment 1 to embodiment 6 meet a relationship shown in Table 13 respectively.

TABLE 11

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −1.1340 | | | | |
| S1 | Aspheric | 5.9566 | 2.3157 | 1.55 | 56.1 | 10.79 | −0.0567 |
| S2 | Aspheric | −500.0000 | 0.5890 | | | | −99.0000 |
| S3 | Aspheric | 312.6419 | 1.2314 | 1.55 | 56.1 | 40.70 | 99.0000 |
| S4 | Aspheric | −23.9112 | 0.1191 | | | | −31.2414 |
| S5 | Aspheric | −27.2996 | 0.5211 | 1.62 | 23.5 | −10.98 | 22.6404 |
| S6 | Aspheric | 9.6588 | 0.5795 | | | | 2.6573 |
| S7 | Aspheric | 7.9969 | 0.5516 | 1.55 | 56.1 | 243.78 | −0.1376 |
| S8 | Aspheric | 8.3002 | 4.2937 | | | | −2.5779 |
| S9 | Aspheric | −11.4148 | 0.4677 | 1.67 | 20.4 | 19.15 | −4.5243 |
| S10 | Aspheric | −6.1316 | 0.0711 | | | | −0.7924 |
| S11 | Aspheric | 483.2086 | 0.4233 | 1.55 | 56.1 | −12.70 | −99.0000 |
| S12 | Aspheric | 6.8424 | 4.1186 | | | | 2.1089 |
| S13 | Spherical | Infinite | 0.3300 | 1.51 | 64.2 | | |
| S14 | Spherical | Infinite | 4.6881 | | | | |
| S15 | Spherical | Infinite | | | | | |

TABLE 12

| Surface number | A4 | A6 | A8 | A10 | A12 | A14 | A16 | A18 | A20 |
|---|---|---|---|---|---|---|---|---|---|
| S1 | −2.6519E−04 | 2.9863E−05 | −1.1788E−05 | 2.4438E−06 | −3.9468E−07 | 4.0748E−08 | −2.4885E−09 | 8.0657E−11 | −1.0637E−12 |
| S2 | −2.8147E−04 | 2.1293E−04 | −6.2423E−05 | 7.6697E−06 | −3.2257E−07 | −2.0041E−08 | 2.6788E−09 | −1.0079E−10 | 1.2639E−12 |
| S3 | 8.8533E−05 | −5.2711E−05 | 4.2206E−05 | −1.7760E−05 | 4.4142E−06 | −6.1336E−07 | 4.6567E−08 | −1.7932E−09 | 2.7227E−11 |
| S4 | −3.2197E−03 | 4.0859E−03 | −1.9717E−03 | 5.6848E−04 | −1.0270E−04 | 1.1843E−05 | −8.5530E−07 | 3.5677E−08 | −6.6206E−10 |
| S5 | 8.2633E−04 | 8.3620E−03 | −4.7692E−03 | 1.4332E−03 | −2.6533E−04 | 3.1392E−05 | −2.3232E−06 | 9.8637E−08 | −1.8491E−09 |
| S6 | 3.1364E−03 | 7.3619E−03 | −3.4580E−03 | 5.6717E−04 | 5.2107E−05 | −3.6222E−05 | 6.0668E−06 | −4.6046E−07 | 1.3510E−08 |
| S7 | −7.2930E−03 | 4.3059E−03 | −4.4763E−04 | −7.2129E−04 | 4.1868E−04 | −1.0813E−04 | 1.5214E−05 | −1.1313E−06 | 3.4958E−08 |
| S8 | −7.0308E−03 | 1.8073E−03 | 1.9817E−04 | −6.3890E−04 | 3.3270E−04 | −8.8113E−05 | 1.3104E−05 | −1.0418E−06 | 3.4625E−08 |
| S9 | 1.4002E−03 | −4.9697E−03 | 4.7220E−03 | −2.9189E−03 | 1.0138E−03 | −1.9918E−04 | 2.1165E−05 | −1.0253E−06 | 1.1002E−08 |
| S10 | −3.4245E−03 | 7.4226E−04 | 3.4788E−03 | −4.3045E−03 | 2.0364E−03 | −5.0501E−04 | 6.9568E−05 | −5.0367E−06 | 1.4910E−07 |
| S11 | −3.9739E−02 | 1.6055E−02 | −2.7139E−03 | −2.9595E−03 | 2.1402E−03 | −6.3718E−04 | 1.0037E−04 | −8.2271E−06 | 2.7747E−07 |
| S12 | −3.5757E−02 | 1.2798E−02 | −5.1004E−03 | 1.4568E−03 | −2.4765E−04 | 1.9357E−05 | 3.6075E−07 | −1.6602E−07 | 8.0659E−09 |

TABLE 13

| Conditional expression/embodiment | 1 | 2 | 3 | 4 | 5 | 6 |
|---|---|---|---|---|---|---|
| f5 × (tanω)² (mm) | 0.58 | 0.63 | 0.78 | 0.60 | 0.69 | 0.59 |
| ImgH/f × TTL (mm) | 3.64 | 3.60 | 3.68 | 3.68 | 3.73 | 3.66 |
| (R9 + R10)/(R9 − R10) | 3.12 | 3.48 | 4.45 | 3.41 | 4.84 | 3.32 |
| R6/R1 | 1.62 | 1.43 | 1.10 | 1.65 | 1.69 | 1.62 |
| SAG52/SAG51 | 1.66 | 1.61 | 1.51 | 1.56 | 1.50 | 1.65 |
| (f1 + f2)/f | 2.19 | 3.64 | 3.49 | 2.02 | 1.79 | 2.15 |
| CT3/T34 | 0.98 | 0.84 | 0.57 | 0.96 | 0.81 | 0.90 |
| f2/f1 × R1 (mm) | 23.45 | 37.26 | 36.06 | 20.08 | 15.44 | 22.47 |
| TD/ΣCT | 2.06 | 2.08 | 2.29 | 2.00 | 1.98 | 2.03 |
| (DT11 + DT12)/(DT11 − DT12) | 42.13 | 38.19 | 50.33 | 36.56 | 31.55 | 39.03 |

The disclosure also provides an imaging device, of which an electronic photosensitive element may be a Charge Coupled Device (CCD) or a Complementary Metal Oxide Semiconductor (CMOS). The imaging device may be an independent imaging device such as a digital camera, or may be an imaging module integrated into a mobile electronic device such as a mobile phone. The imaging device is provided with the abovementioned optical imaging lens group.

The above description is only description about the preferred embodiments of the disclosure and adopted technical principles. It is understood by those skilled in the art that the scope of invention involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the disclosure.

What is claimed is:

1. An optical imaging lens group with six lenses, sequentially comprising, from an object side to an image side along an optical axis:
    a diaphragm;
    a first lens with a positive refractive power, an object-side surface thereof being a convex surface;
    a second lens with a positive refractive power;
    a third lens with a negative refractive power, an image-side surface thereof being a concave surface;
    a fourth lens with a positive refractive power, an object-side surface thereof being a convex surface, while an image-side surface thereof being a concave surface;
    a fifth lens with a positive refractive power, an object-side surface thereof being a concave surface, while an image-side surface thereof being a convex surface; and
    a sixth lens with a negative refractive power, an object-side surface thereof being a convex surface, while an image-side surface thereof being a concave surface,
    wherein ω is a half of a field of view of the optical imaging lens group, and f5 is an effective focal length of the fifth lens, f5 and ω meet: 0.50 mm<f5×(tan ω)²<1.00 mm;
    R9 is a curvature radius of an object-side surface of the fifth lens, and R10 is a curvature radius of an image-side surface of the fifth lens, R9 and R10 meet: 3.00<(R9+R10)/(R9−R10)<5.00;
    f is a total effective focal length of the optical imaging lens group, f1 is an effective focal length of the first lens, and f2 is an effective focal length of the second lens, f, f1 and f2 meet: 1.50<(f1+f2)/f<4.00.

2. The optical imaging lens group according to claim 1, wherein TTL is a distance from the object-side surface of the first lens to an imaging surface of the optical imaging lens group on the optical axis, ImgH is a half of a diagonal length of an effective pixel region on the imaging surface, and f is a total effective focal length of the optical imaging lens group, TTL, f and ImgH meet: ImgH/f×TTL>3.50 mm.

3. The optical imaging lens group according to claim 1, wherein R1 is a curvature radius of the object-side surface of the first lens and R6 is a curvature radius of an image-side surface of the third lens, R1 and R6 meet: 1.00<R6/R1<2.00.

4. The optical imaging lens group according to claim 1, wherein SAG51 is an on-axis distance from an intersection point of an object-side surface of the fifth lens and the optical axis to an effective radius vertex of the object-side surface of the fifth lens, SAG52 is an on-axis distance from an intersection point of an image-side surface of the fifth lens and the optical axis to an effective radius vertex of the image-side surface of the fifth lens, SAG51 and SAG52 meet: 1.40<SAG52/SAG51<2.00.

5. The optical imaging lens group according to claim 1, wherein T34 is a spacing distance of the third lens and the fourth lens on the optical axis, and CT3 is a center thickness of the third lens on the optical axis, T34 and CT3 meet: 0.50<CT3/T34<1.50.

6. The optical imaging lens group according to claim 1, wherein f1 is an effective focal length of the first lens, f2 is an effective focal length of the second lens, and R1 is a curvature radius of the object-side surface of the first lens, f1, f2 and R1 meet: 15.00 mm<f2/f1×R1<40.00 mm.

7. The optical imaging lens group according to claim 1, wherein TD is a distance from the object-side surface of the first lens to the image-side surface of the sixth lens on the optical axis, and ΣCT is a sum of center thicknesses of the first lens to the sixth lens on the optical axis respectively, TD and ΣCT meet: 1.50<TD/ΣCT<2.50.

8. The optical imaging lens group according to claim 1, wherein DT11 is a maximum effective radius of the object-side surface of the first lens and DT12 a maximum effective radius of an image-side surface of the first lens, DT11 and DT12 meet: 30.00<(DT11+DT12)/(DT11−DT12)<50.50.

9. The optical imaging lens group according to claim 1, wherein f is a total effective focal length of the optical imaging lens group, f meet: f>23.50 mm.

10. An optical imaging lens group with six lenses, sequentially comprising, from an object side to an image side along an optical axis:
    a diaphragm;
    a first lens with a positive refractive power, an object-side surface thereof being a convex surface;
    a second lens with a positive refractive power;
    a third lens with a negative refractive power, an image-side surface thereof being a concave surface;

a fourth lens with a positive refractive power, an object-side surface thereof being a convex surface, while an image-side surface thereof being a concave surface;

a fifth lens with a positive refractive power, an object-side surface thereof being a concave surface, while an image-side surface thereof being a convex surface; and a sixth lens with a negative refractive power, an object-side surface thereof being a convex surface, while an image-side surface thereof being a concave surface, wherein TTL is a distance from the object-side surface of the first lens to an imaging surface of the optical imaging lens group on the optical axis, ImgH is a half of a diagonal length of an effective pixel region on the imaging surface, and f is a total effective focal length of the optical imaging lens group, TTL, f and ImgH meet: ImgH/f×TTL>3.50 mm;

R9 is a curvature radius of an object-side surface of the fifth lens, and R10 is a curvature radius of an image-side surface of the fifth lens, R9 and R10 meet: 3.00<(R9+R10)/(R9−R10)<5.00;

f is a total effective focal length of the optical imaging lens group, f1 is an effective focal length of the first lens, and f2 is an effective focal length of the second lens, f, f1 and f2 meet: 1.50<(f1+f2)/f<4.00.

11. The optical imaging lens group according to claim 10, wherein TD is a distance from the object-side surface of the first lens to the image-side surface of the sixth lens on the optical axis, and ΣCT is a sum of center thicknesses of the first lens to the sixth lens on the optical axis respectively, TD and ΣCT meet: 1.50<TD/ΣCT<2.50.

12. The optical imaging lens group according to claim 11, wherein ω is a half of a field of view of the optical imaging lens group, and f5 is an effective focal length of the fifth lens, f5 and ω meet: 0.50 mm<f5×(tan ω)$^2$<1.00 mm.

13. The optical imaging lens group according to claim 10, wherein R1 is a curvature radius of the object-side surface of the first lens and R6 is a curvature radius of an image-side surface of the third lens, R1 and R6 meet: 1.00<R6/R1<2.00.

14. The optical imaging lens group according to claim 10, wherein SAG51 is an on-axis distance from an intersection point of an object-side surface of the fifth lens and the optical axis to an effective radius vertex of the object-side surface of the fifth lens, SAG52 is an on-axis distance from an intersection point of an image-side surface of the fifth lens and the optical axis to an effective radius vertex of the image-side surface of the fifth lens, SAG51 and SAG52 meet: 1.40<SAG52/SAG51<2.00.

15. The optical imaging lens group according to claim 10, wherein T34 is a spacing distance of the third lens and the fourth lens on the optical axis, and CT3 is a center thickness of the third lens on the optical axis, T34 and CT3 meet: 0.50<CT3/T34<1.50.

16. The optical imaging lens group according to claim 10, wherein f1 is an effective focal length of the first lens, f2 is an effective focal length of the second lens, and R1 is a curvature radius of the object-side surface of the first lens, f1, f2 and R1 meet: 15.00 mm<f2/f1×R1<40.00 mm.

* * * * *